(12) United States Patent
Witmer

(10) Patent No.: US 9,222,786 B2
(45) Date of Patent: Dec. 29, 2015

(54) METHODS AND SYSTEMS FOR CREATING DIGITAL TRANSPORTATION NETWORKS

(75) Inventor: James Alan Witmer, Lebanon, NH (US)

(73) Assignee: TomTom North America, Inc., Lebanon, NH (US)

(*) Notice: Subject to any disclaimer, the term of this patent is extended or adjusted under 35 U.S.C. 154(b) by 719 days.

(21) Appl. No.: 13/318,794

(22) PCT Filed: Apr. 23, 2010

(86) PCT No.: PCT/US2010/032143
§ 371 (c)(1),
(2), (4) Date: Jan. 20, 2012

(87) PCT Pub. No.: WO2010/129192
PCT Pub. Date: Nov. 11, 2010

(65) Prior Publication Data
US 2012/0116678 A1     May 10, 2012

Related U.S. Application Data

(60) Provisional application No. 61/215,238, filed on May 4, 2009, provisional application No. 61/215,239, filed on May 4, 2009, provisional application No. 61/187,494, filed on Jun. 16, 2009, provisional application No. 61/273,185, filed on Aug. 3, 2009, provisional application No. 61/279,981, filed on Oct. 29, 2009.

(51) Int. Cl.
| | |
|---|---|
| *G01V 3/38* | (2006.01) |
| *G01C 21/32* | (2006.01) |
| *G06F 17/30* | (2006.01) |
| *G09B 29/00* | (2006.01) |

(52) U.S. Cl.
CPC .......... *G01C 21/32* (2013.01); *G06F 17/30241* (2013.01); *G09B 29/00* (2013.01)

(58) Field of Classification Search
CPC ........ G01C 21/26; G01C 21/30; G01C 21/36; G01C 21/3667; G01C 21/165; G09B 29/007
See application file for complete search history.

(56) References Cited

U.S. PATENT DOCUMENTS

| | | |
|---|---|---|
| 6,385,539 B1 | 5/2002 | Wilson et al. |
| 6,735,515 B2 | 5/2004 | Bechtolsheim et al. |
| 7,516,041 B2 | 4/2009 | Smartt et al. |

(Continued)

FOREIGN PATENT DOCUMENTS

| | | |
|---|---|---|
| DE | 102007045082 A1 | 4/2009 |
| EP | 1939589 A1 | 7/2008 |

OTHER PUBLICATIONS

International Search Report issued Jun. 16, 2010 for International Application No. PCT/US2010/032143.

*Primary Examiner* — Elias Desta

(57) ABSTRACT

In a method for creating a digital representation of a transportation network, acquired probe traces are refined based on characteristics of the transportation network. Geographic objects associated with the transportation network are identified based on the refined probe traces. A digital geographic network is built based on the refined probe traces and identified geographic objects, and the digital representation of the transportation network is created by linking the identified geographic objects in the digital geographic network.

22 Claims, 21 Drawing Sheets

(56) References Cited

U.S. PATENT DOCUMENTS

| | | |
|---|---|---|
| 2002/0161513 A1* | 10/2002 | Bechtolsheim et al. ...... 701/208 |
| 2007/0129892 A1 | 6/2007 | Smartt et al. |
| 2007/0288158 A1 | 12/2007 | Dorum |
| 2009/0093959 A1 | 4/2009 | Scherzinger et al. |
| 2010/0305851 A1 | 12/2010 | Meyer et al. |
| 2011/0125811 A1* | 5/2011 | Witmer .......................... 707/812 |
| 2012/0277985 A1* | 11/2012 | Witmer .......................... 701/119 |

* cited by examiner

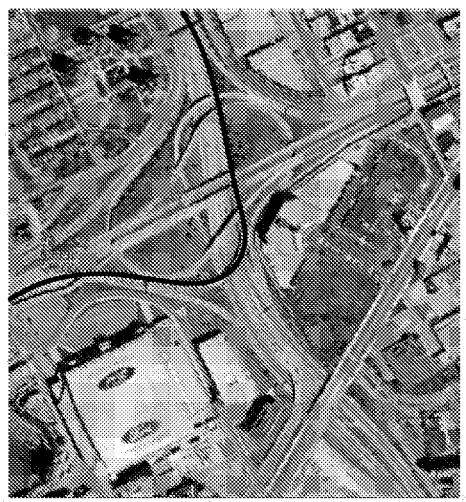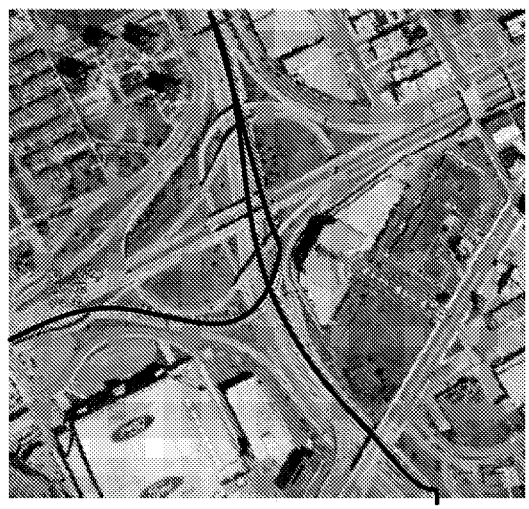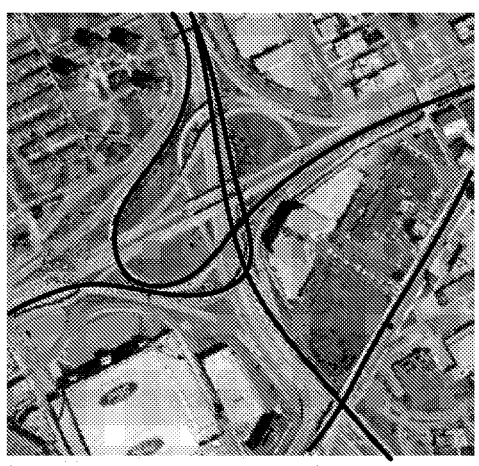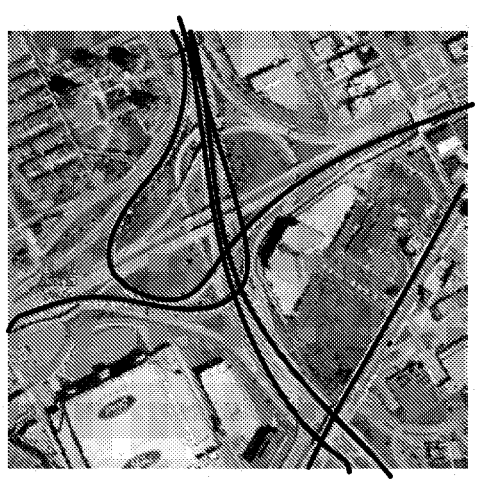
FIG. 19

METHODS AND SYSTEMS FOR CREATING DIGITAL TRANSPORTATION NETWORKS

CROSS-REFERENCE TO RELATED APPLICATION(S)

This application claims priority under 35 U.S.C. §119(e) to U.S. provisional application Nos. 61/215,238, filed on May 4, 2009; 61/215,239, filed on May 4, 2009; 61/187,494, filed on Jun. 16, 2009; 61/273,185, filed on Aug. 3, 2009; and 61/279,981, filed on Oct. 26, 2009. The entire contents of each of these provisional applications is incorporated herein by reference.

FIELD

The present application generally relates to navigation methods and devices. More specifically, at least some example embodiments relate to methods and systems for creating digital representations of transportation networks.

BACKGROUND

A transportation network is any navigable system of roads, pedestrian walkways, paths, rivers, shipping lanes or other network that is utilized to transport humans or vehicles. A transportation network can also include combinations of routes for the above modes of transportation. These combinations of routes are referred to as multimodal transportation networks. A segment of a transportation network (referred to as a transportation network segment) is a portion of the transportation network that represents a path of travel for a vehicle or pedestrian without a method of entry or exit other than at its end points.

A transportation network can be modeled and stored as a digital representation in a digital map database. In so doing, the transportation network is usually represented by geometry and associated attribution. Conventionally, in the context of a transportation network, attribution limits how travel can flow on the network. For example, attribution may include: speed of travel, whether or not a turn at an intersection is allowed, etc.

Geometry can be stored in the digital map database as a series of polylines connected at nodes. Polylines are a series of sequential coordinates that usually represent the centerline of a transportation segment. Nodes are connectors between the polylines, and generally occur at intersections where there is a decision point with respect to travel from one transportation network segment to another. Nodes can also occur at intersections with other map features such as a political boundary, geographic feature (e.g., a river), etc.

Alternatively, geometry can be stored in the digital map database by fitting a polyline to a path taken by a group of vehicles (a population). In this alternative example, the paths through an intersection for various maneuvers are disparate and the nodes represent locations where the paths (the statistics of the populations) on a road are indistinguishable. In this case, nodes do not coincide with intersections. Rather, nodes are placed at non-decision points where all traffic must travel in the same direction and there is no option to turn off a given path. In this example, geometry describes a maneuver or maneuvers, which defines the path taken between two non-decision points, and the nodes represent locations where one can transition between maneuvers.

Typically, digital transportation networks are created by traversing all paths/elements of the transportation network with highly specialized location measuring and recording systems designed for this purpose. In an alternative method, transportation network information is gleaned from aerial images or compiled from existing localized digital transportation networks.

One conventional method for creating a digital transportation network utilizes probe traces for updating/refining the transportation network. Probe traces are a plurality of sequential location measurements from location sensors. Typically, the location sensors are housed in a plurality of vehicles or carried by a plurality of pedestrians. But, conventional methods for creating digital transportation networks from uncoordinated probe traces are limited because the digital transport network must be "seeded" manually with at least an initial approximation of individual transportation elements. The probe traces are then used only to refine and improve accuracy. Conventionally, digital transportation networks are not generated or built (e.g., created from scratch) based on uncoordinated probe traces. In addition, the conventional art does not address the junction of transportation network segments in an automated fashion.

Recently, increasing numbers of vehicles are being equipped with Personal Navigation Devices (PNDs) or other device equipped to determine location. Conventional PNDs are capable of collecting and storing location information over time and uploading the location information to a central processor (or server) for analysis. This location information can be used to generate a representation of a transportation network segment as described above.

Location measurements from a single PND or similar device, however, are typically not sufficiently accurate to generate a digital transportation network for certain applications such as an Advance Driver Assistance System (ADAS). For example, positional accuracy for a road network in an ADAS should be less than about 5 meters. But, typical location measurements from conventional PNDs are on the order of about +/−10 to 15 meters.

SUMMARY

Example embodiments relate to methods for creating digital representations of transportation networks.

At least some example embodiments provide methods for distinguishing road intersections and determining which probe traces fall along which road segments or individual road lanes automatically using statistical analysis techniques.

At least some example embodiments also provide methods for determining which intersecting road segments are connected in terms of traffic flow. The location and information regarding or associated with connections between road segments enables a transportation network suitable for vehicle or pedestrian routing to be created in addition to providing a centerline for a road, a lane or walkway segment. As discussed with respect to at least this example embodiment, the centerline is an as-driven centerline, rather than an as-painted centerline. An as-driven centerline refers to a centerline determined based on actual probe data generated by probe vehicles, whereas an as-painted centerline is a centerline determined based on the manner in which a road is painted.

In addition, at least some methods according to example embodiments utilize clustering techniques to enable ordering and storing of probe traces to improve and/or optimize the processing of data for both processing speed and accuracy.

Methods according to example embodiments are automated and create not only individual transportation elements, but a contiguous network of transportation elements that are linked and suitable for vehicle or pedestrian routing and guidance. Methods according to example embodiments do not require human intervention. That is, for example, methods according to example embodiments may be performed independent of human intervention.

Transportation network databases according to example embodiments may be used in routing and navigation applications requiring relatively high accuracy and/or precision such as Advanced Driver Assistance Systems (ADASs).

Methods described herein are suitable for building and/or creating a digital transportation network based on a series of probe traces acquired by on-board navigation devices (NDs), personal navigation devices (PNDs) or other devices capable of: collecting instantaneous vehicle position (or location) measurements; storing the measurements; and transmitting the measurements to a central storage and processing unit such as a server.

Methods described herein are also suitable for building and/or creating a digital transportation network based on a series of probe traces acquired by on-board navigation devices (NDs), personal navigation devices (PNDs) or other devices capable of: collecting instantaneous vehicle position measurements; storing the measurements and transmitting the measurements from one navigation device to one or more other navigation devices via in-vehicle communications, without a central storage or processing unit. In this example, each navigation device may build and/or create at least a portion of its own digital transportation network on-the-fly based on information received from one or more other navigation devices.

At least some example embodiments described herein do not require a "seed" or basic representation of the transportation network being created to generate the transportation network geometry.

At least one example embodiment provides a method for creating a digital representation of a transportation network. According to at least this example embodiment, acquired probe traces are refined based on characteristics of the transportation network, and geographic objects associated with the transportation network are identified based on the refined probe traces. A digital geographic network is built based on the refined probe traces and identified geographic objects, and the digital representation of the transportation network is created by linking the identified geographic objects in the digital geographic network.

At least one other example embodiment provides a system for creating a digital representation of a transportation network. According to at least this example embodiment, the system includes: a geographic network generation module and a digital transportation network generation module. The geographic network generation module is configured to: refine acquired probe traces based on characteristics of the transportation network; identify geographic objects associated with the transportation network based on the refined probe traces; and build a digital geographic network based on the refined probe traces and identified geographic objects. The digital transportation network generation module is configured to create the digital representation of the transportation network by linking geographic objects among groups of geographic objects in the digital geographic network.

BRIEF DESCRIPTION OF THE DRAWINGS

Various aspects of the teachings of the present disclosure, and arrangements embodying those teachings, will hereafter be described by way of illustrative example with reference to the accompanying drawings, in which:

FIG. 19 shows a progressive mean probe trace processing beginning with largest density of coincident probe traces;

DETAILED DESCRIPTION OF EXAMPLE EMBODIMENTS

Figure 1:
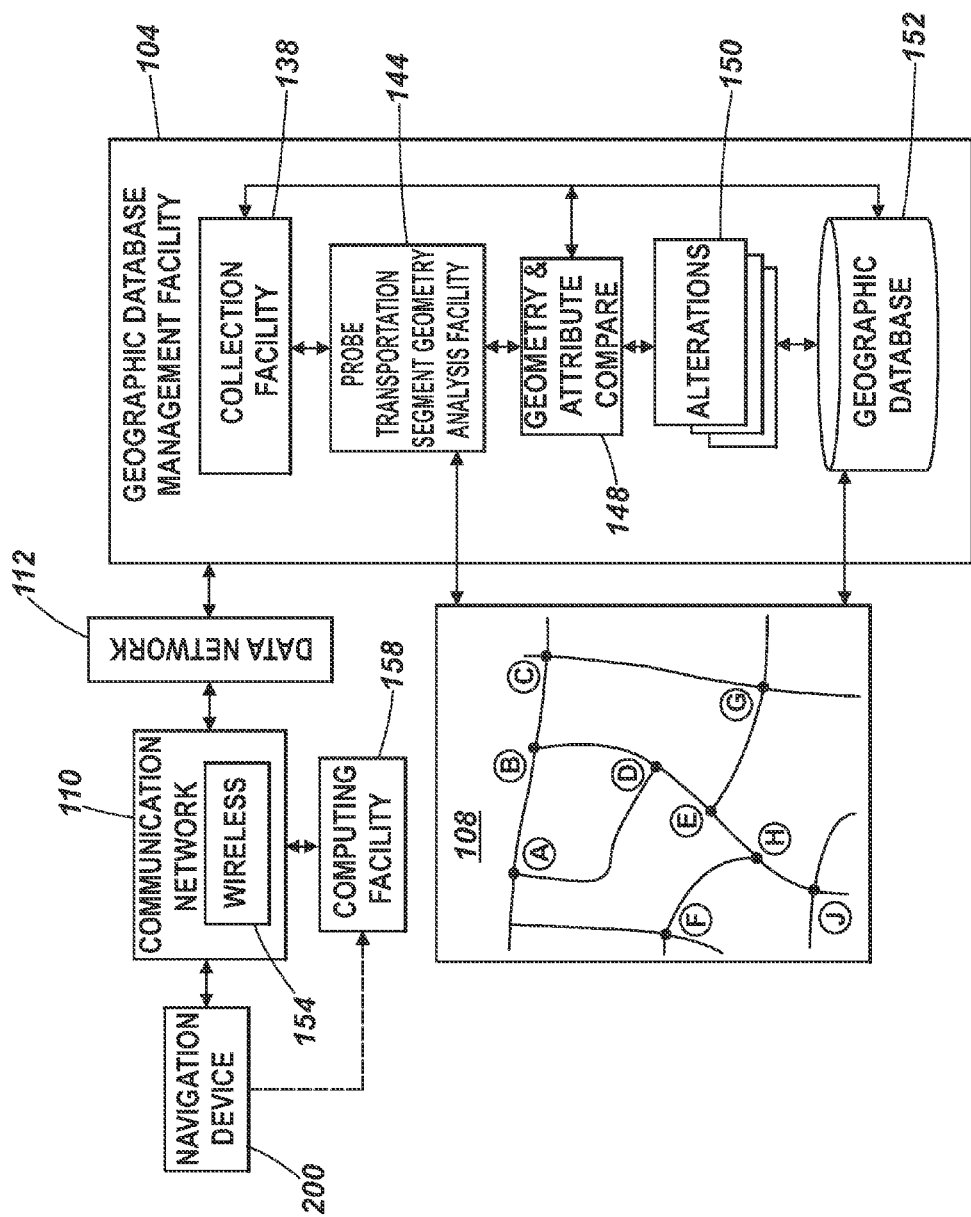
FIG. 1 is a block diagram detailing various component parts of a map database system according to an example embodiment.

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms such as "beneath," "below," "lower," "above," "upper" and the like, may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, for example, those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation(s) on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It is convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, that perform particular tasks or implement particular abstract data types and may be implemented using existing hardware at existing network elements or control nodes (e.g., a database). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing," "computing," "calculating," "determining," "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of computer readable medium or implemented over some type of transmission medium. The computer readable medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

In at least some cases, example embodiments of the present disclosure are described with particular reference to a geographic database. It should be remembered, however, that the teachings of the present disclosure are not limited to any particular form of database but are instead universally applicable to any type of database and/or any processing device that is configured to execute a program to access data in a data structure, the data being associated with mapping data, but not exclusively mapping data. It follows therefore that in the context of the present application, a geographic database is intended to include any database accessible to a server, computer or computing device configured for accessing data, generating new maps and/or updating maps based on the accessed data.

Example embodiments of the present disclosure may be described with particular reference to a navigation device (ND) or personal navigation device (PND). It should be remembered, however, that the teachings of the present disclosure are not limited to NDs or PNDs, but are instead universally applicable to any type of processing device that is configured to execute navigation software so as to provide route planning and navigation functionality. It follows, therefore, that in the context of the present application, a navigation device is intended to include (without limitation) any type of route planning and navigation device, irrespective of whether that device is embodied as a PND, a navigation device built into a vehicle, or a computing resource (such as a desktop or portable personal computer (PC), mobile telephone or portable digital assistant (PDA)) executing route planning and navigation software. In addition to street/road networks, example embodiments may be implemented in pedestrian navigation networks and/or any other type of transportation network (e.g., a metro train) or combinations of transportation networks (referred to as multimodal transportation networks).

Segments in these transportation networks (e.g., a portion of a road and/or sidewalk) are often referred to as navigable features. Boundaries of these segments (e.g., centerlines, shoulder lines, stop signs, etc.) may be referred to as geometric features. Navigable and geometric features are not limited in any way to the aforementioned examples.

While example embodiments described herein utilize GPS measurements (probe trace points) including latitude and longitude coordinates as location measurements, it should be understood that location measurements may be obtained from any source and are not limited to GPS. For example, other Global Navigation Satellite Systems (GNSSs) such as GLONAS, Galileo, Compas, etc. or non-GNSS systems (e.g., inertial indoor systems) may be used.

Further, while location measurements described herein operate in two spatial dimensions, the discussed example embodiments may be implemented in three or more dimensions.

It will be apparent from the following description that the teachings of the present disclosure have utility in circumstances where a user is not seeking instructions on how to navigate from one point to another, but merely wishes to be provided with a view of a given location.

At least one example embodiment provides a method for creating a digital representation of a transportation network. According to at least this example embodiment, acquired probe traces are refined based on characteristics of the transportation network, and geographic objects associated with the transportation network are identified based on the refined probe traces. A digital geographic network is built based on the refined probe traces and identified geographic objects, and the digital representation of the transportation network is created by linking the identified geographic objects in the digital geographic network.

According to at least some example embodiments, the refined probe traces are clustered based on a relative spatial proximity of associated geographic objects. Further, the building of the digital geographic network includes: bundling, for each unique probe path in the transportation network, probe traces in each cluster representing measurements along a same probe path; and identifying and merging probe paths that intersect one another. Child probe paths are created by splitting probe paths at intersection points, and the geographic network is created based on the merged probe paths and child probe paths.

According to at least some example embodiments, the clustering of the refined probe traces includes: creating one of a spatial index and range-tree structure based on the refined probe traces.

The unique probe path is a path traversed by one or more probe traces having the same beginning and end within a spatial threshold value and which does not deviate, in location, more than a threshold value from a reference probe trace.

According to at least some example embodiments, the bundling includes: identifying a reference probe trace for each bundle of probe traces, the reference probe trace being a probe trace passing through a densely populated area of probe traces; and bundling, for each reference probe trace, probe traces that do not deviate more than a given distance from the reference probe trace.

Further, the identifying and merging includes: identifying intersecting centerline probe traces; averaging a distance separating the centerline probe traces; and merging the probe paths based on the averaged distance.

According to at least some example embodiments, the clustering of the refined probe traces includes: generating a spatial index for the refined probe traces, the spatial index including a grid having a plurality of grid cells, each grid cell including a representation of a portion of the geographic objects of the transportation network.

According to at least some example embodiments, the creating includes: linking geographic objects to adjacent and coincident geographic objects in adjacent spatially indexed areas.

Attribution is applied to the geographic objects to generate the digital representation of the transportation network. The attribution may include at least one of direction of traffic flow, number of lanes in a multilane highway, turn restrictions; average speed limits, stop signs, stop signals, elevation for polylines, and allowable vehicle types.

The refining of probe traces may include at least one of curve smoothing, adjusting the positioning of probe traces depending on direction of traffic flow for road centerline capture, filtering probe traces not associated with a type of the transportation network, and segmenting probe traces at inferred intersections.

At least one other example embodiment provides a system for creating a digital representation of a transportation network. According to at least this example embodiment, the system includes a geographic network generation module and a digital transportation network generation module. The geographic network generation module is configured to: refine acquired probe traces based on characteristics of the transportation network; identify geographic objects associated with the transportation network based on the refined probe traces; and build a digital geographic network based on the refined probe traces and identified geographic objects. The digital transportation network generation module is configured to create the digital representation of the transportation network by linking geographic objects among groups of geographic objects in the digital geographic network.

According to at least some example embodiments, the geographic network generation module is configured to: cluster the refined probe traces based on a relative spatial proximity of associated geographic objects. And, the digital transportation network generation is configured to: bundle, for each unique probe path in the transportation network, probe traces in each group representing measurements along a same probe path; identify and merge probe paths that intersect with one another; create child probe paths by splitting probe paths at intersection points; and generate the digital geographic network based on the merged probe paths and child probe paths.

The geographic network generation module is further configured to: create one of a spatial index and range-tree structure based on the refined probe traces.

The probe path is a path traversed by one or more probe traces having the same beginning and end within a spatial threshold value and which does not deviate, in location, more than a threshold value from a reference probe trace.

The geographic network generation module is further configured to: identify a reference probe trace for each bundle of probe traces, the reference probe trace being a probe trace passing through a densely populated area of probe traces; bundle, for each reference probe trace, probe traces that do not deviate more than a given distance from the reference probe trace.

According to at least some example embodiments, the geographic network generation module is further configured to: identify intersecting centerline probe traces; average a distance separating the centerline probe traces; and merge the probe paths based on the average distance.

The geographic network generation module is further configured to: generate a spatial index for the refined probe traces, the spatial index including a grid having a plurality of grid cells, each grid cell including a representation of a portion of the geographic objects of the transportation network.

The digital transportation network generation module is further configured to: link geographic objects to adjacent and coincident geographic objects in adjacent spatially indexed areas.

The digital transportation network generation module is further configured to: apply attribution to the geographic objects. The attribution may include: at least one of direction of traffic flow, number of lanes in a multilane highway, turn restrictions; average speed limits, stop signs, stop signals, elevation for polylines, and allowable vehicle types.

The geographic network generation module is further configured to: refine probe traces by at least one of curve smoothing, adjusting the positioning of probe traces depending on direction of traffic flow for road centerline capture, filtering probe traces not associated with a type of the transportation network, and segmenting probe traces at inferred intersections.

FIG. 1 is a block diagram detailing various component parts of a map database system.

Referring to FIG. 1, a navigation device (ND) 200 communicates with a geographic database management facility 104 through a communication network 110 and data network 112. The communication network 110 may be a wireless communications network 154 through a service provider (e.g., through a cellular network); a wireless communications network 154 through an area network (e.g., through a Wi-Fi hot spot or WiMAX); a wired connection to a computing facility 158 (e.g., as provided to a home personal computer); or the like.

In example embodiments, the data network 112 connected between the communications network 110 and the geographic database management facility 104 may be, for example, a local area network (LAN), personal area network (PAN), campus area network (CAN), Metropolitan area network (MAN), wide area network (WAN), global area network (GAN), internetwork, intranet, extranet and/or the Internet.

The communication network 110 is not limited to a particular communication technology. Additionally, the communication network 110 is not limited to a single communication technology; that is, the network 110 may include several communication links that use a variety of technologies. For example, the communication network 110 may be adapted to provide a path for electrical, optical, and/or electromagnetic communications. As such, the communication network 110 may include, but is not limited to, one or a combination of the following: electric circuits, electrical conductors such as wires and coaxial cables, fiber optic cables, converters, radio-frequency (RF) waves, the atmosphere, empty space, etc. Furthermore, the communication network 110 may include one or more intermediate devices such as routers, repeaters, buffers, transmitters, and receivers, for example.

In one illustrative arrangement, the communication network 110 may include telephone and computer networks. Furthermore, the communication network 110 may be capable of accommodating wireless communication, for example radio frequency, microwave frequency and/or infra-red communication. Additionally, the communication network 110 may accommodate satellite communication.

The communication signals transmitted through the communication network 110 may include, for example: signals adapted for cellular communication technology such as Time Division Multiple Access (TDMA), Frequency Division Multiple Access (FDMA), Code Division Multiple Access (CDMA), Global System for Mobile Communications (GSM), etc. Both digital and analogue signals may be transmitted through the communication network 110. These signals may be modulated, encrypted and/or compressed signals as may be desirable for the communication technology.

Still referring to FIG. 1, the geographic database management facility 104 includes a collection facility 138. The collection facility 138 collects road characteristic and/or probe data from a plurality of navigation devices 200, or other non-navigation probe devices (e.g., truck monitoring systems for collection of probe data).

As discussed above, probe data may include sequential location measurements such as probe trace points. Probe trace points identify coordinates on the surface of the Earth, which are usually expressed in latitude, longitude and, possibly, altitude (e.g., in meters above sea level). The time at which these measurements were recorded may also be stored. From a sequential set of these measurements, heading, velocity and slope can be derived. Location measurements may be acquired periodically (e.g., every 5 seconds) by the navigation device 200.

Still referring to FIG. 1, acquired probe data is provided to a probe transportation segment geometry analysis facility 144. At the probe transportation segment geometry analysis facility 144, transportation network segment geometry and attributes are inferred from the collected probe data. A geometry and attribute compare unit 148 compares the inferred probe geometry and attributes with geometry and attributes stored in the geographic database 152 to detect and interpret differences. The geometry and attribute compare unit 148 generates alterations 150 that can be applied to both the geometry and attribution of the geographic database 152.

Ultimately, alterations 150 may be provided to the geographic database 152 and on to users as a part of an update to a local geographic database of, for example, navigation device 200.

Example embodiments may utilize probe vehicles equipped with sensors that collect information such as position, speed, heading, slope, time, and the like. The collected information may be used to infer changing conditions of transportation network 108 over time. In example embodiments, a system (such as the system shown in FIG. 1) may collect data from a plurality of probe vehicles traversing a transportation network 108 over a first period of time and compare this collected data to a plurality of vehicles traversing the same transportation network 108 over a second period of time.

The comparison may also be between the first set of data and data associated with the same transportation network, which is stored in geographic database 152. By comparing these two sets of data, changes in travel patterns may be used to infer changes in road conditions and/or road routings. For example, if drivers travel both North and South over the same or a closely similar locus of points (likely a road) during the first time period, but travel only North for the same locus of points during the second period of time, it may be inferred that a significant change has been made to the direction of travel allowed on the road (attribution) that represents this collection of data, and that the road has been made a one-way road. In another example embodiment, the comparing may be omitted by creating a new map based on the collected probe data for the segment. In this example, a seed or basic representation of the transportation network is not required.

In another example, if most vehicles merely slow before proceeding through a specific intersection during a first period of time, but most vehicles come to a complete stop during a second period of time, it may be inferred that a new stop sign has been placed at the intersection. By tracking vehicles over time, a geographic database provider may be provided a timelier indicator of changes in the transportation network 108, which may lead to more timely changes in the geographic database 152 and/or a new geographic database 152. These changes may enable user updates and or new maps that better reflect the current state of a transportation network 108.

Figure 2:
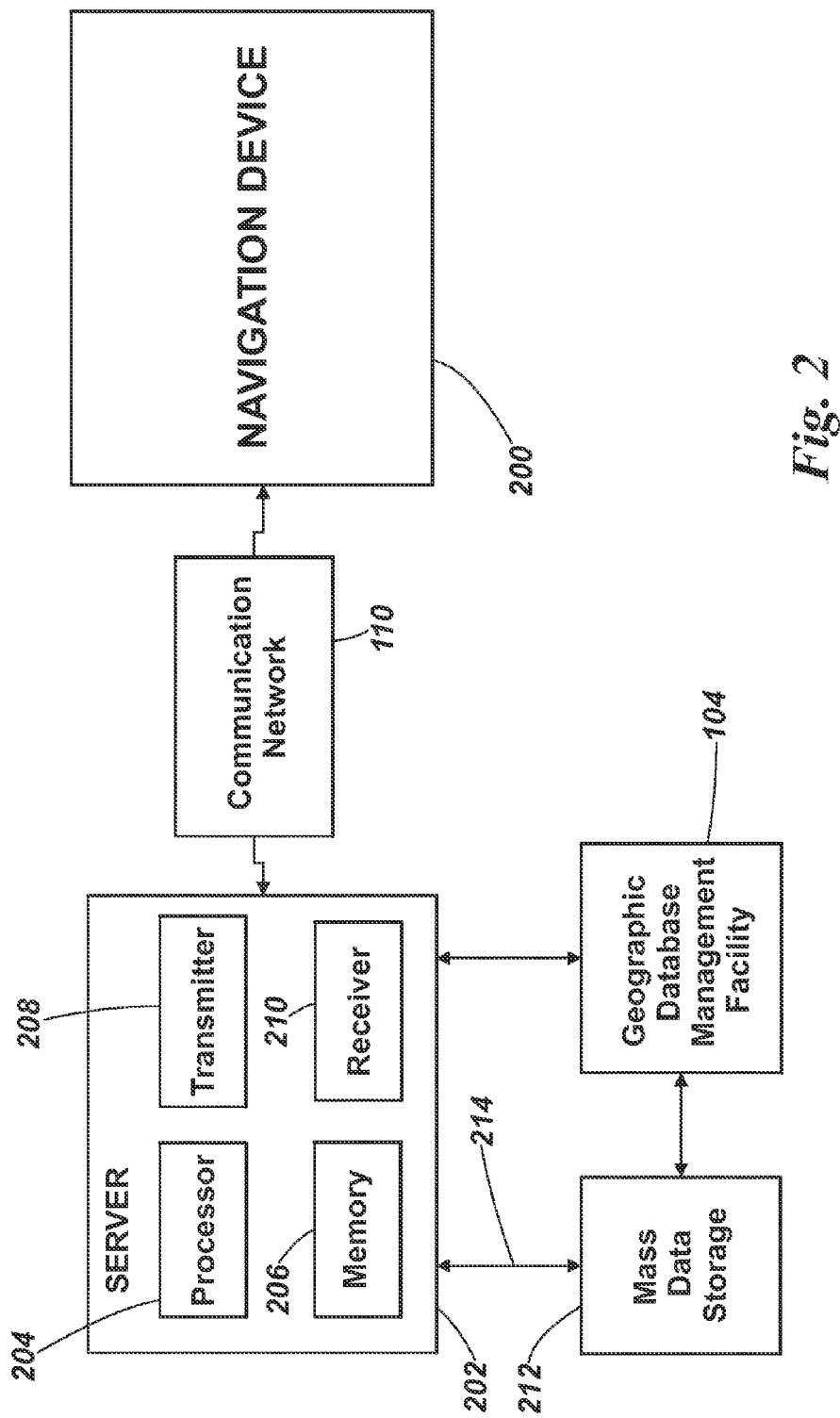
FIG. 2 is a schematic illustration of the manner in which a navigation device may receive or transmit information over a wireless communication channel.

FIG. 2 is a schematic illustration of an example manner in which a navigation device transmits or receives information over a wireless communication channel.

Referring to FIG. 2, the navigation device 200 may establish a "mobile" or telecommunications network connection with a server 202 via a mobile device (e.g., a mobile phone, PDA, and/or any device with mobile phone technology), which is not shown. In so doing, the navigation device 200 may establish a digital connection (e.g., a digital connection via known Bluetooth technology) with the mobile device. Thereafter, the mobile device can establish a network connection (through the Internet for example) with the server 202 through a network service provider. Through the "mobile" network connection, the navigation device 200 and the server 202 may exchange "real-time" or at least very "up to date" information via communication network 110.

The establishing of the network connection between the mobile device (via a service provider) and another device such as the server 202, using the Internet, for example, may be done in a known manner. This may include use of TCP/IP layered protocol for example. The mobile device may utilize any number of communication standards, for example CDMA, GSM, WAN, GPRS (General Packet Radio Service), GSRM, etc.

The navigation device 200 may include mobile phone technology within the navigation device 200 itself (including an antenna or optionally using the internal antenna of the navigation device 200). The mobile phone technology within the navigation device 200 may include internal components as specified above, and/or may include an insertable card (e.g., Subscriber Identity Module (SIM) card), complete with necessary mobile phone technology and/or an antenna for example. As such, mobile phone technology within the navigation device 200 may similarly establish a network connection between the navigation device 200 and the server 202, via the Internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information may be updated.

In FIG. 2 the navigation device 200 is depicted as being in communication with the server 202 via a generic communication network 110 that may be implemented by any of a number of known arrangements.

The server 202 includes a receiver 210 configured to receive sequential location measurements (e.g., probe trace points) from the navigation device 200. The server 202 further includes a processor 204 configured to, inter alia, determine a baseline based on the sequential location measurements along the at least one navigable feature, sort and cluster the sequential location measurements into a plurality of location measurement groups that are along the baseline, and determine a geometric feature of the at least one navigable feature based on distributions of sequential location measurements.

The processor 204 is operatively connected to a transmitter 208, the receiver 210 and a memory 206. The transmitter 208 and the receiver 210 transmit/receive information to/from the navigation device 200 via the communication network 110. The signals sent and received may include, for example, data, communication, and/or other propagated signals. Although described separately, the functions of the transmitter 208 and the receiver 210 may be combined into a signal transceiver.

The processor 204 is also operatively connected to a mass data storage device 212 via a wired or wireless connection 214. The mass storage device 212 may contain a store of navigation data and map information, and may be a separate device from the server 202. Alternatively, the mass data storage device 212 may be incorporated into the server 202. The server 202 is further connected to (or includes) the geographic database management facility 104 described above with regard to FIG. 1.

The navigation device 200 may be adapted to communicate with the server 202 through the communication network 110, and may include at least a processor and a memory as described in more detail below with regard to FIG. 3.

Software stored in the memory 206 may provide instructions for the processor 204 and may allow the server 202 to provide services to the navigation device 200. One service provided by the server 202 may involve, for example, processing requests from the navigation device 200 and transmitting navigation data from the mass data storage 212 to the navigation device 200. Another service provided by the server 202 may include, for example, processing the navigation data using various algorithms for a desired application and sending the results of these calculations to the navigation device 200.

The server 202 may include a remote server accessible by the navigation device 200 via a wireless channel. The server 202 may include a network server located on, for example, a local area network (LAN), wide area network (WAN) and/or virtual private network (VPN). More specifically, for example, the server 202 may include a personal computer such as a desktop or a laptop computer. The communication network 110 may be a cable connected between the personal computer and the navigation device 200. Alternatively, a personal computer may be connected between the navigation device 200 and the server 202 to establish an Internet connection between the server 202 and the navigation device 200. Alternatively, a mobile telephone or other handheld device may establish a wireless connection to the internet, for connecting the navigation device 200 to the server 202 via the internet.

The navigation device 200 may be provided with information from the server 202 via information downloads, which may be periodically updated automatically or upon a user connecting navigation device 200 to the server 202 and/or may be more dynamic upon a more constant or frequent connection between the server 202 and navigation device 200 via a wireless mobile connection device and TCP/IP connection, for example. For many dynamic calculations, the processor 204 may handle the bulk of the processing needs. However, the processor 510 of navigation device 200 (shown in FIG. 3) may also handle processing and calculation, often times independent of a connection to server 202.

The navigation device 200 may also provide information to server 202. For example, navigation device 200 may include hardware and/or software (described in more detail below with regard to FIG. 3) configured to provide probe data to the geographic database management facility 104 via, for example, communication network 110 and server 202.

Figure 3:
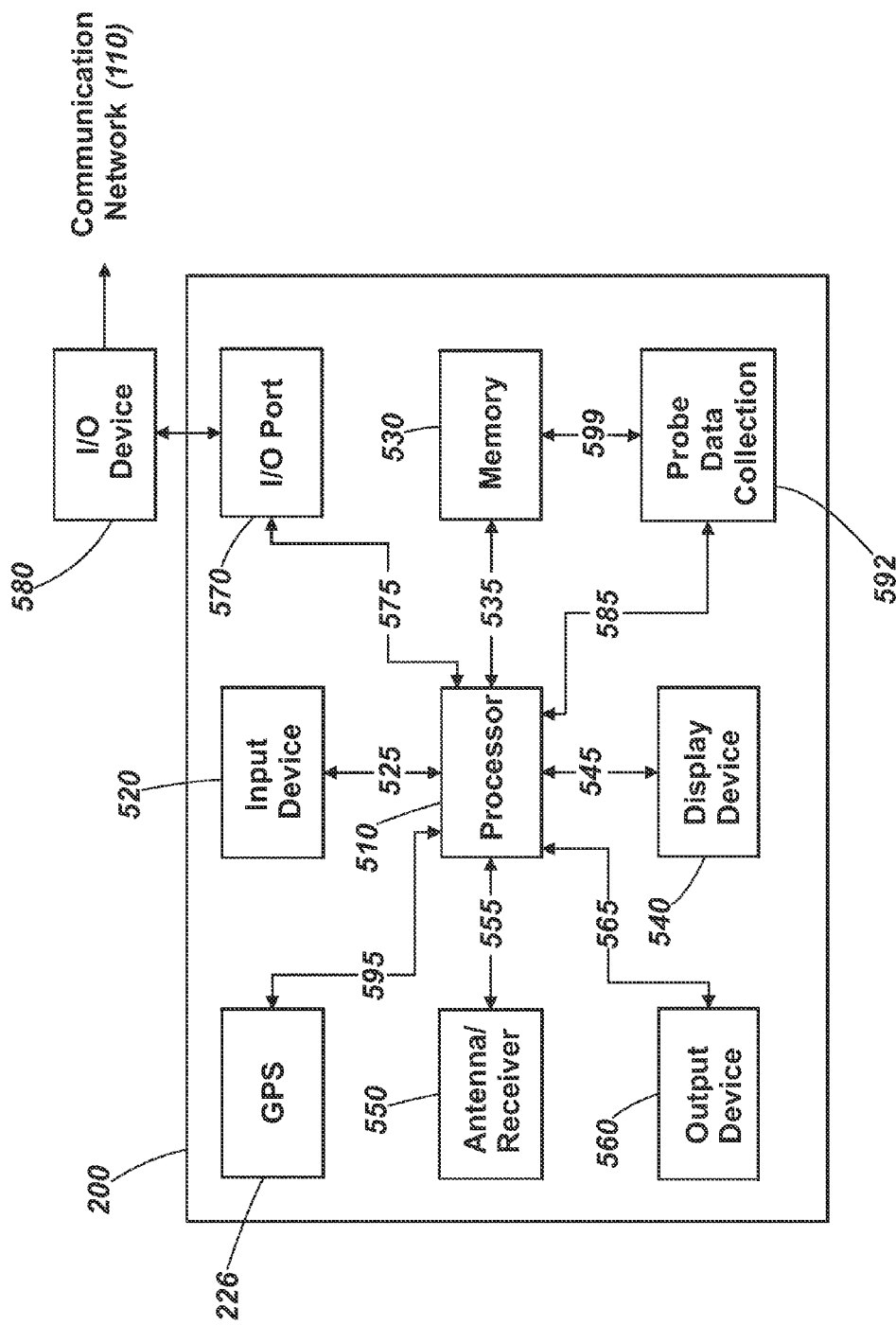
FIG. 3 is a schematic illustration of a navigation device according to an example embodiment.

FIG. 3 is a block diagram illustrating a navigation device according to an example embodiment in more detail. It should be noted that the block diagram of the navigation device 200 is not inclusive of all components of the navigation device, but is only representative of some example components.

The navigation device 200 includes a processor 510 connected to an input device 520 and a display screen 540. The input device 520 can include a keyboard device, voice input device, touch panel and/or any other known input device for inputting information. The display screen 540 can include any type of display screen such as an LCD display, for example. In an example arrangement, the input device 520 and display screen 540 are integrated into an integrated input and display device, including a touchpad or touch screen input so that a user need only touch a portion of the display screen 540 to select one of a plurality of display choices or to activate one of a plurality of virtual buttons.

The navigation device may include an output device 560, for example an audible output device (e.g., a loudspeaker). Input device 520 can include a microphone and software for receiving input voice commands.

Still referring to FIG. 3, the processor 510 is operatively connected to and configured to receive information from the input device 520 via a connection 525. The processor 510 is also operatively connected to at least one of display screen 540 and output device 560, via output connections 545 and 565, respectively. Further, the processor 510 is operably coupled to a memory resource 530 via connection 535 and is further adapted to receive/send information from/to input/output (I/O) ports 570 via connection 575. The I/O port 570 may be connected to an I/O device 580 external to the navigation device 200.

The memory 530 may include, for example, a volatile memory (e.g., Random Access Memory (RAM)) and a non-volatile memory (e.g., a digital memory, such as a flash memory). The external I/O device 580 may include an external listening device such as an earpiece or the like. The connection to I/O device 580 can further be a wired or wireless connection to any other external device such as a car stereo unit for hands-free operation and/or for voice activated operation for example, for connection to an ear piece or head phones, and/or for connection to a mobile phone.

FIG. 3 further illustrates an operative connection between the processor 510 and an antenna/receiver 550 via connection 555. In one example, the antenna/receiver 550 may be a GPS antenna/receiver. The antenna and receiver designated by reference numeral 550 are combined schematically for illustration. But, the antenna and receiver may be separate components. The antenna may be a GPS patch antenna or helical antenna for example.

The navigation device 200 may use embedded GPS receiver 226 to determine current data (e.g., position, speed, heading, slope, etc.) associated with the navigation device 200. GPS receiver 226 is connected to processor 510 via connection 595. This data, in combination with a local geographic database (e.g., stored in memory 530), may be used to provide a user of the navigation device 200 with information associated with their current travel conditions. This information may include, for example: location in relation to a stored map in the local geographic database; estimated time of arrival given a destination; location of proximate points of interest and information thereof. The probe data collection facility 592 may collect said information from the navigation device 200 and local geographic database over a period of time, and either store the information for later transmission, or transmit the information real-time through the navigation device's 200 communication system, for example, via I/O device 580 and communication network 110. The probe data collection facility 592 is connected to the processor 510 via connection 585. The probe data collection facility 592 is also connected to the memory 530 via connection 599.

The portable or handheld navigation device 200 of FIG. 3 can be connected or "docked" in a known manner to a vehicle such as a bicycle, a motorbike, a car or a boat, for example. Such a navigation device 200 is then removable from the docked location for portable or handheld navigation use.

Figure 21:
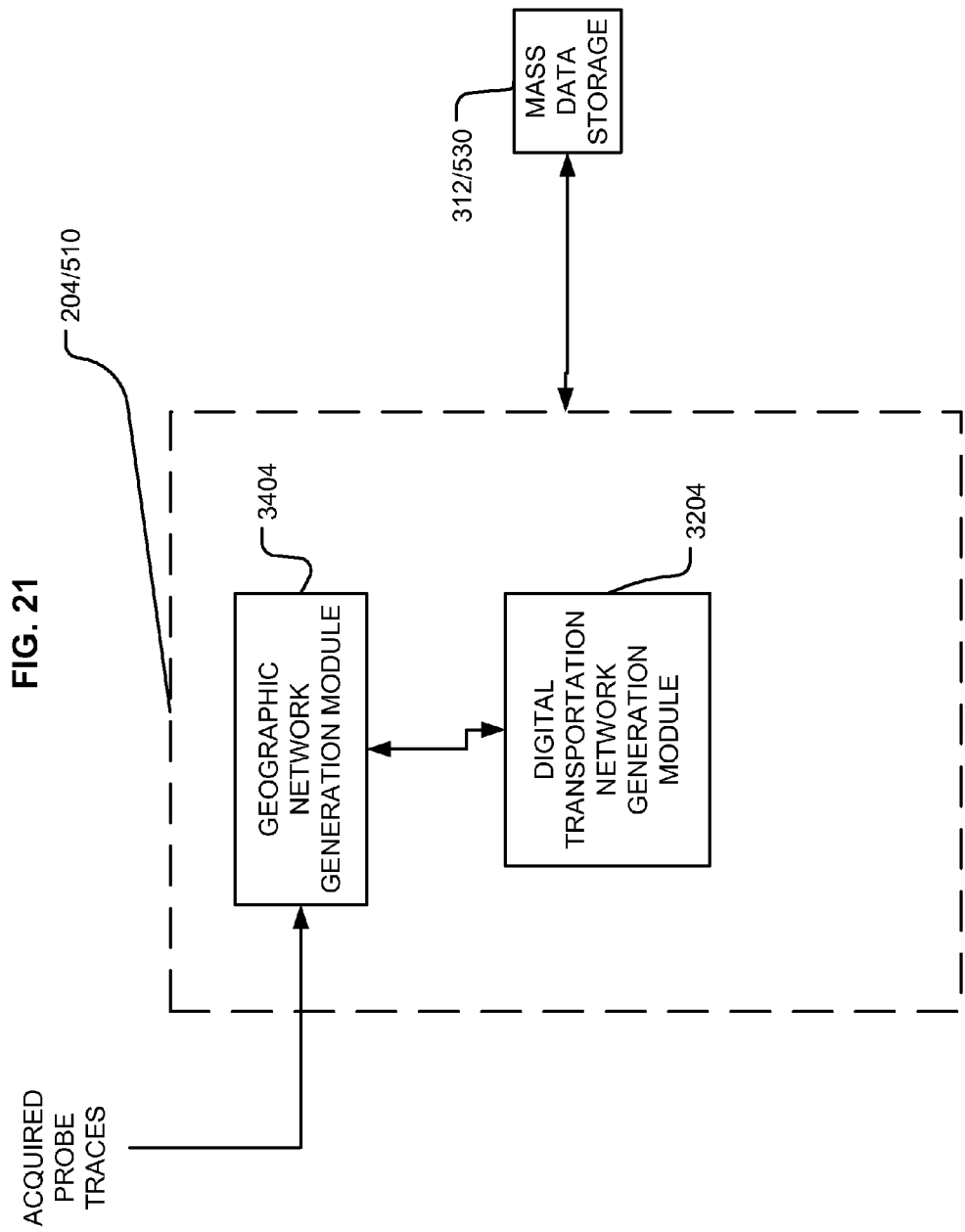
FIG. 21 is a more detailed illustration of an example embodiment of a processor or device configured to generate a digital representation of a transportation network.

FIG. 21 is a block diagram illustrating an example embodiment of the processor 204 of FIG. 2 and/or the processor 510 shown in FIG. 3 in more detail. For the sake of clarity, the block diagram shown in FIG. 21 will be discussed in detail with regard to the processor 204/510.

As shown in FIG. 21, the processor 204/510 includes a geographic network generation module 3404 and a digital transportation network generation module 3204, which are operatively connected to one another. Example operation of the processor 204/510 will be described in more detail in connection with the flow chart shown in FIGS. 6A and 6B.

Figure 4:
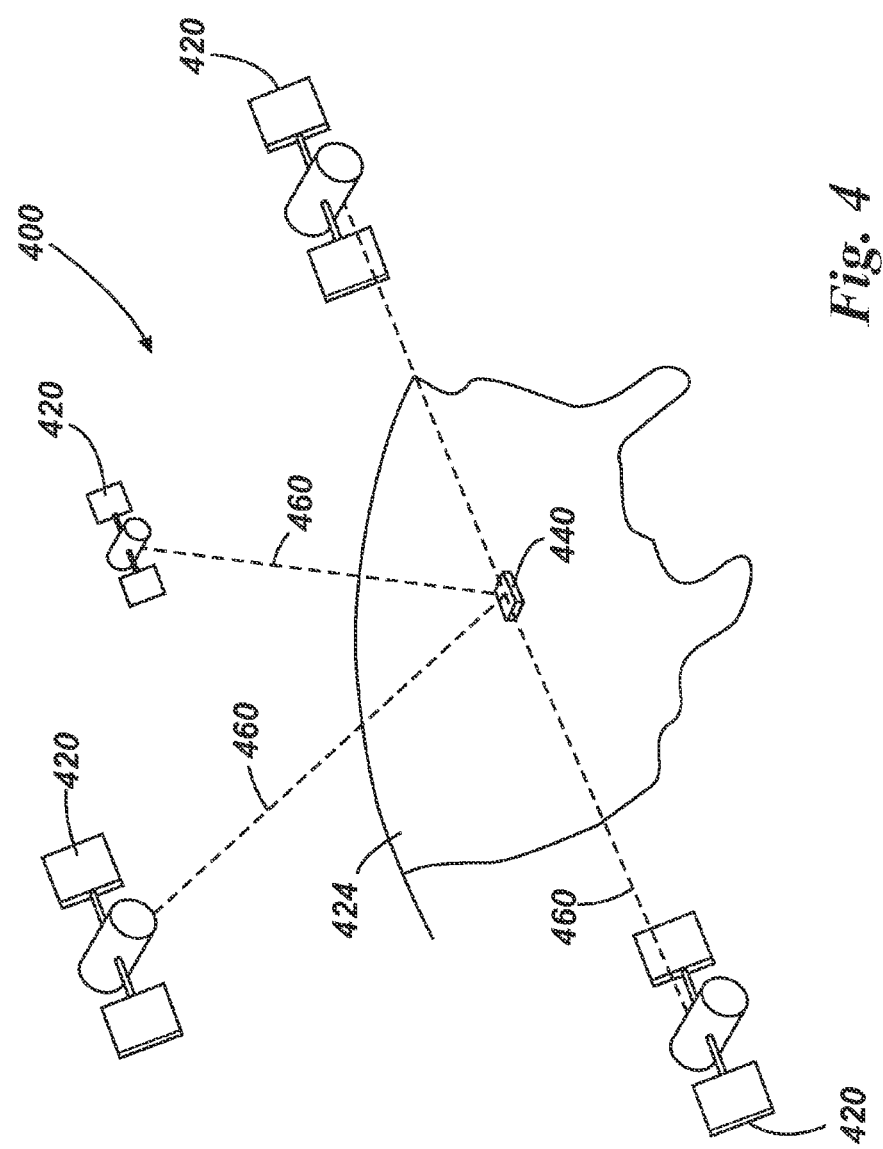
FIG. 4 is a schematic illustration of a Global Positioning System (GPS)

FIG. 4 illustrates an example Global Positioning System (GPS), usable by navigation devices according to example embodiments. Such systems are known and used for a variety of purposes. In general, GPS is a satellite-radio based navigation system capable of determining continuous position, velocity, time, and in some instances, direction information for an unlimited number of users. Formerly known as NAVSTAR, GPS incorporates a plurality of satellites, which orbit the earth in extremely precise orbits. Based on these precise orbits, GPS satellites can relay their location to any number of receiving units. Because GPS is generally known, only a brief discussion will be provided herein.

GPS is implemented when a device, specially equipped to receive GPS data, begins scanning modulation codes for GPS satellite signals. Upon synchronizing to a radio signal from a GPS satellite, the device determines the precise location of that satellite via one of a plurality of different conventional methods. In most instances, the device continues scanning for signals until acquiring at least four different satellite signals (it is noted, however, that position is not normally, but can be determined with only three signals using other triangulation techniques). Implementing geometric triangulation, the receiver utilizes the four known positions to determine its own three-dimensional position relative to the satellites. This can be done in any known manner. The position and velocity data can be updated in real time on a continuous basis by an unlimited number of users.

Referring to FIG. 4, the GPS system 400 includes a plurality of satellites 420 orbiting the Earth 424. The orbit of each satellite 420 is not necessarily synchronous with the orbits of other satellites 420 and, in fact, is likely asynchronous. A GPS receiver 440 is shown receiving spread spectrum GPS satellite signals 460 from the various satellites 420.

The spread spectrum signals 460, continuously transmitted from each satellite 420, utilize a highly accurate frequency standard accomplished with an extremely accurate atomic clock. Each satellite 420, as part of its data signal transmission 460, transmits a data stream indicative of that particular satellite 420. It is appreciated by those skilled in the relevant art that the GPS receiver device 440 generally acquires spread spectrum GPS satellite signals 460 from at least four satellites 420 for the GPS receiver device 440 to calculate its three-dimensional position by triangulation.

As noted above, although example embodiments are described herein with regard to GPS, other Global Navigation Satellite Systems (GNSSs) or non-GNSS systems (e.g., inertial indoor systems may be used. For example, GNSSs such as GLONAS, Galileo, Compas, etc. may be used.

At least some example embodiments provide methods for creating a digital representation of a transportation network based on probe traces and without manual human intervention. As noted similarly above, probe traces are typically a series of sequentially stored coordinates (or location measurements) usually measured at a constant time interval along a transportation network segment on which a probe vehicle is travelling. The location measurements may or may not conform to the central limit theorem of probability. That is, a sufficiently large number of location measurements for the same physical location may be normally distributed around the actual location. Alternatively, if samples do not follow the central limit theorem and are not normally distributed, an average of a captured location may be utilized according to the Law of Large Numbers. However, the average of the captured locations is distinct from the actual location, and thus, an error is compensated as described in more detail later.

Probe traces typically provide a 3-dimensional (3D) reference, which includes a vertical component as well as Cartesian coordinates (e.g., location on the surface of the Earth). As discussed herein, 'probe data' refers to, for example, any positional data and any data from which a position (e.g., a location) may be derived. Probe data also refers to data indicating, for example: speed, heading, slope, etc. Additional probe data that can provide location information may be derived from, for example, aerial and satellite photography, terrestrial based imagery from Mobile Mapping Vehicles, GPS and other position determination equipment, GIS platforms and spatial database engines, Lidar, Laser Scanners, radars, the Internet, telescopic surveys, and any other method of collecting data from which a position may be determined. Probe data may be used to generate, for example, a transportation network map, such as an electronic map used in a PND, a transportation network database and/or a digital representation of a transportation network.

As discussed herein, probe data is also sometimes referred to as vehicle location measurement data.

Figure 5:
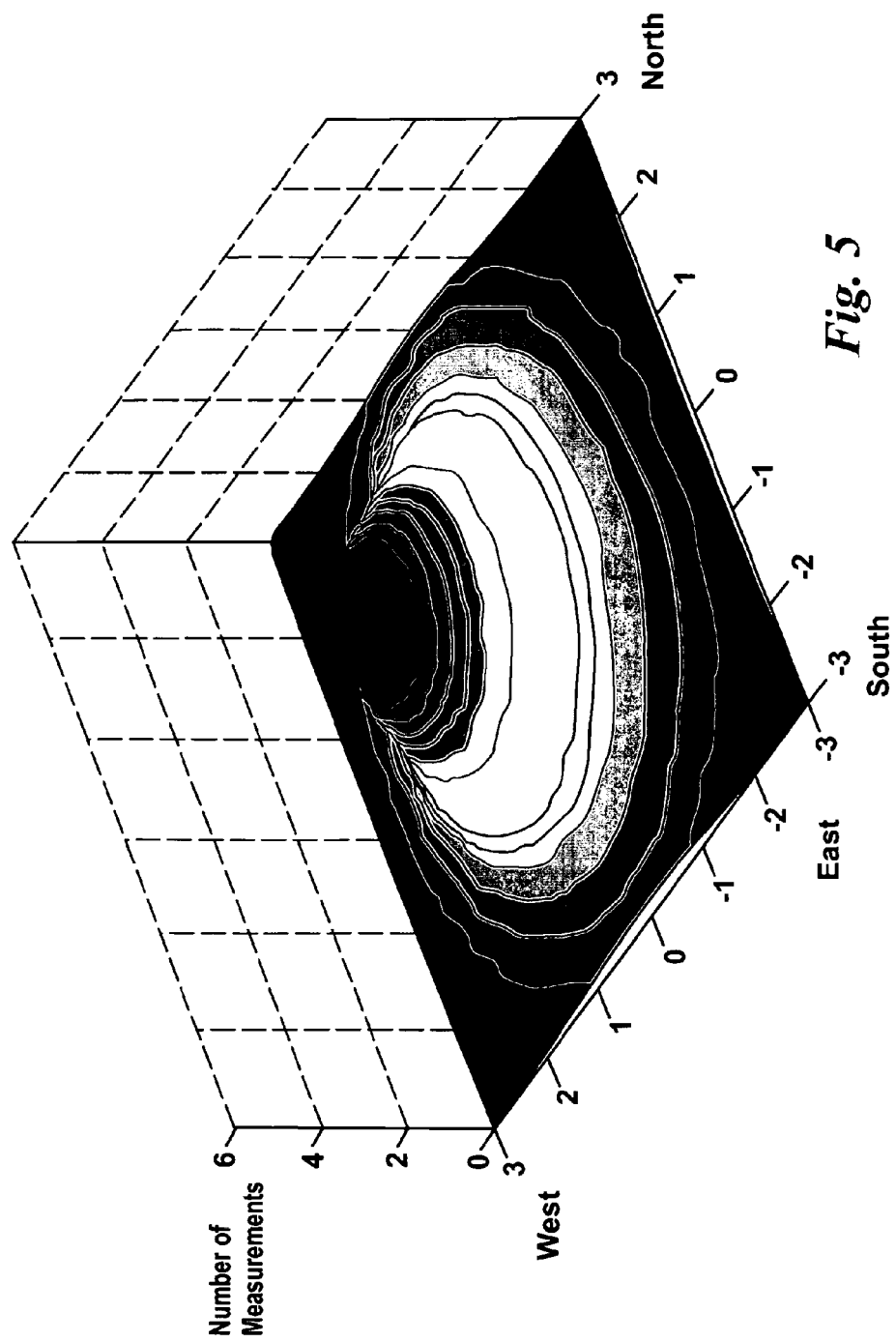
FIG. 5 shows an example of a normal (Gaussian) distribution of numerous measurements for a given location using position sensors such as a GPS receiver.

FIG. 5 shows a normal (Gaussian) distribution of numerous measurements for a given location using position sensors such as a GPS receiver.

Referring to FIG. 5, the horizontal axes represent the sensor measurement error in meters (in Cartesian coordinates) for an actual location on the Earth. The vertical axis represents the number of measurements. In this example, the central limit theory implies that the largest number of measurements from a given sensor type is nearest to the actual location. That is, the frequency of measurements is greatest where the error in measurement is the smallest.

According to at least some example embodiments, the above-described central limit theorem may be exploited such that a plurality of relatively inaccurate location measurements for the same location can be utilized to infer a closer approximation to the actual location by fitting a normal distribution curve (or in the case of Cartesian coordinates—a normal distribution surface) to the location measurements and determining the location of the peak of the distribution.

Alternatively, as noted above, an average of samples for a captured location may be utilized even when a distribution of location measurements is not normal according to the Law of Large Numbers. Whether that average conforms to the actual position may be determined by ascertaining any non-random sources of error (e.g., Kalman filtering, which causes positional offsets to all traces and causes the central point to deviate from the actual point).

According to at least some example embodiments, a transportation network may be created based on probe traces by determining: (1) accurate location measurements along the transportation network; (2) a direction of movement along the transportation network segment; (3) intersections of transportation network segments; and (4) allowable maneuvers from one transportation network segment to the next.

A maneuver, in this context, is a generic term to describe moving from one transportation network segment to the next. An example of a simple maneuver is turning left at an intersection. An example of a more complex maneuver is what is referred to as a "Michigan left" where a vehicle is first required to turn right, followed by crossing a median on a boulevard and performing a U-turn to ultimately go left relative to the original position. Such a complex maneuver traverses many transportation network segments. In the case of a relatively simple maneuver, such as a left turn, the average paths of the population making a left and going straight diverge well before the physical intersection, and well before the intersection is indicated in a traditional map. Maneuver here connotes the entire path. In a traditional map database, a maneuver would be represented by a point intersection (node) between two lines with no spatial extent. This, however, is a relatively crude approximation to the reality of motion addressed by the term maneuver. The term maneuver may also apply to 'going straight', but includes the geometry and attributes that describe going straight. A maneuver may also exist within a single transportation network segment. Examples of maneuvers within a single transportation network segment include 'changing lanes' or 'staying in the same lane'. The latter is a trivial case and would be concatenated with a later or earlier maneuver.

In at least one example embodiment, to determine the above-described (1)-(4), the central limit theorem may be applied to entire populations of probe traces rather than discrete location measurements. If a series of probe traces known to travel along a transportation network segment are acquired, the centerline of the transportation network segment may be approximated by applying the central limit theory to the probe traces. If a population of probe traces are known to traverse a certain maneuver, the centerline of that maneuver may be derived from that population.

Further, in at least one example embodiment, if the samples are not normally distributed around the actual location such that central limit theorem is known to generate average points that are not the same as the actual location, a series of probe traces known to travel along a transportation network segment are selected, and a first approximation centerline is generated. The first approximation centerline and its associated characteristics (e.g., speed, standard deviation, device types, etc.) are then used further to refine, suppress and/or eliminate the effects of non-random error, and produce a final determined centerline for the transportation network segment.

Figure 6A:
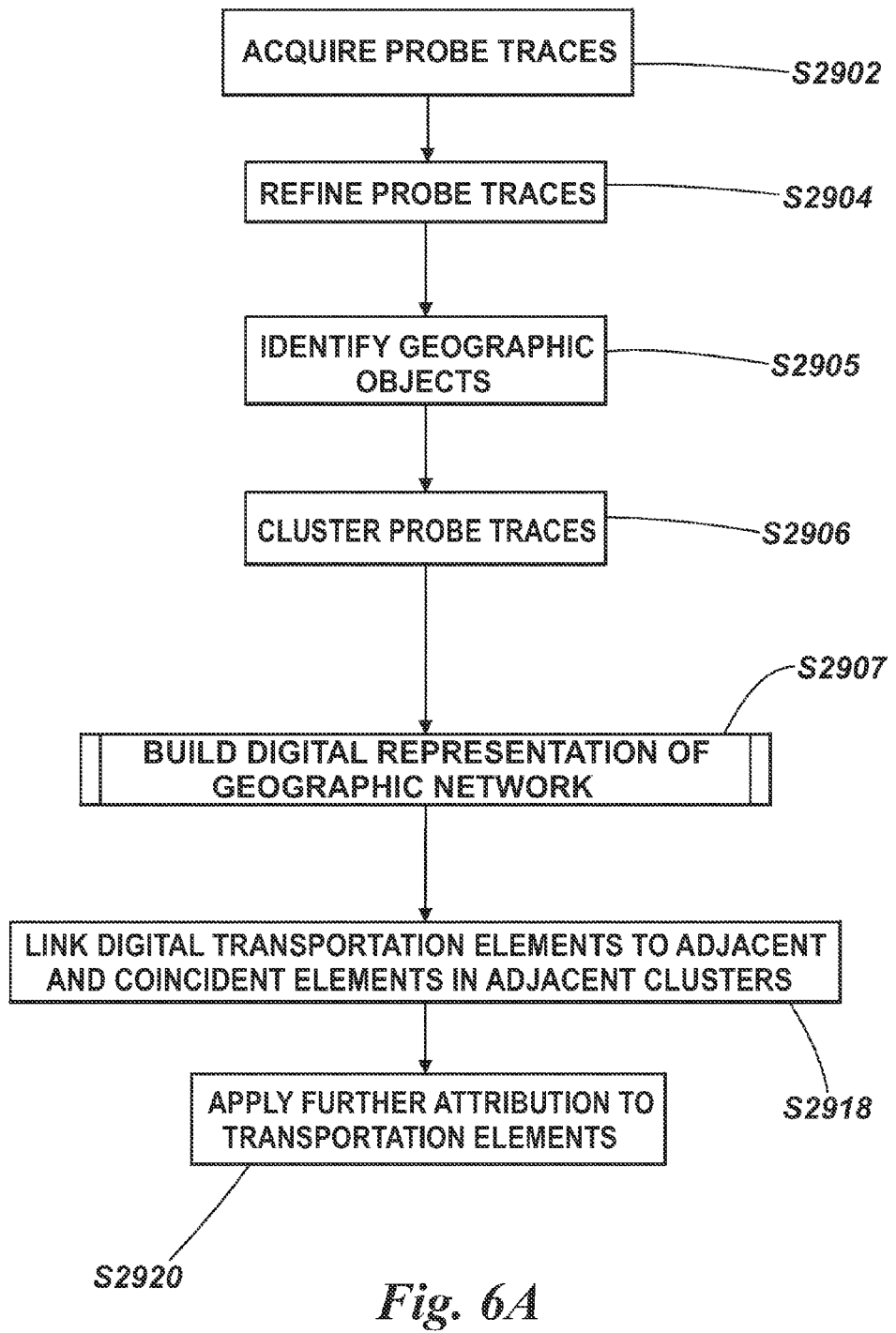
FIG. 6A is a flow chart illustrating a method for creating a digital representation of a transportation network according to an example embodiment.

FIG. 6A is a flow chart illustrating a method for creating a digital representation of a transportation network according to an example embodiment. The example embodiment shown in FIG. 6A is described with regard to creation of a road network. But, example embodiments may be used to create a pedestrian or other transportation network. Further, the method shown in FIG. 6A may be executed/performed by the system shown in FIG. 2, for example. Although not discussed explicitly herein, the method shown in FIG. 6A may be performed in a similar manner by the processor 510 shown in FIG. 3. As noted above, FIG. 21 shows a more detailed illustration of the processor 204 and/or 510. Therefore, some steps of the method shown in FIG. 6A will be described with regard to the example embodiment shown in FIG. 21.

Referring to FIG. 6A, at S2902 vehicle location measurement data is acquired by location measurement data acquisition devices. The location measurement acquisition devices may include navigation devices 200 and the vehicle location measurement data refers to probe traces. Because methods and devices for acquiring vehicle location measurement data such as probe traces are generally known, a detailed discussion is omitted. In the following discussion, vehicle location measurement data will be referred to as probe traces or probe data. In this embodiment, the acquired probe traces are transmitted to the server 202 via communications network 110.

At S2904, the geographic network generation module 3404 refines the acquired probe traces based on known characteristics of the transportation network being modelled. Example methods for refining or conditioning probe traces include: curve smoothing; adjusting the positioning of probe traces depending on direction of traffic flow for road centerline capture; filtering/removing probe traces not associated with the type of transportation network being modelled; and breaking/segmenting probe traces at inferred intersections. These example methods for refining acquired probe traces will be described in more detail later.

As discussed similarly above, low frequency and poor accuracy of probe measurements due to equipment limitations and environmental factors make a single probe trace an inadequate representation of a given transportation network segment. Location sensor resolution from a moving vehicle or pedestrian can vary from +/−about 5 to well over about 10 meters for GPS and greater for other location determining devices. Further, most location sensors are adversely affected by obstacles such as tall buildings or tunnels in the way of a line-of-sight view of the reference for the sensor. A GPS receiver, for example, requires an unrestricted and simultaneous view of several GPS satellites for an accurate position reading.

By understanding the limitations of the measurements and the properties of the transportation network being modelled, raw probe traces may be conditioned or refined to provide more usable data for modelling a transportation network. The probe trace conditioning methods may be applied to the probe traces prior to or subsequent to further processing and rendering of a transportation network database from the probe traces. Methods for conditioning probe traces should not be limited to the methods described herein. Rather, any probe trace conditioning or refining method may be used.

Still referring to S2904 in FIG. 6A, one example method for refining probe traces is known as curve smoothing.

Typically, the sampling frequency of a probe trace is inadequate to accurately define a sharp curve in a road such as a highway on-ramp. Using the fact that most road curves have a constant radius of curvature (so a driver need not constantly turn the wheel while negotiating a turn), a roadway curve may be algorithmically fit to the sparse location measurements along the curve. Additional points to further define and smooth the curve may then be interpolated.

Figure 7:
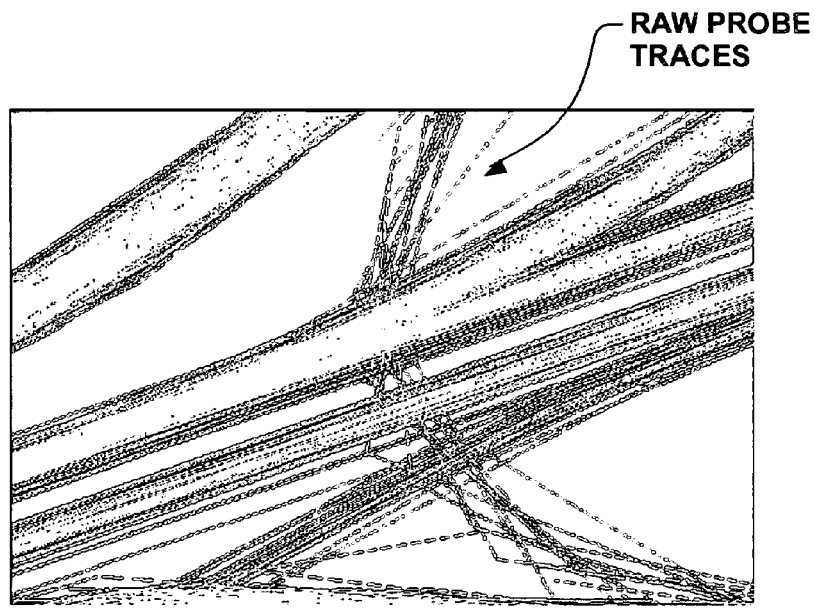
FIGS. 7 and 8 are examples of raw probe traces and conditioned probe traces, respectively.
Figure 8:
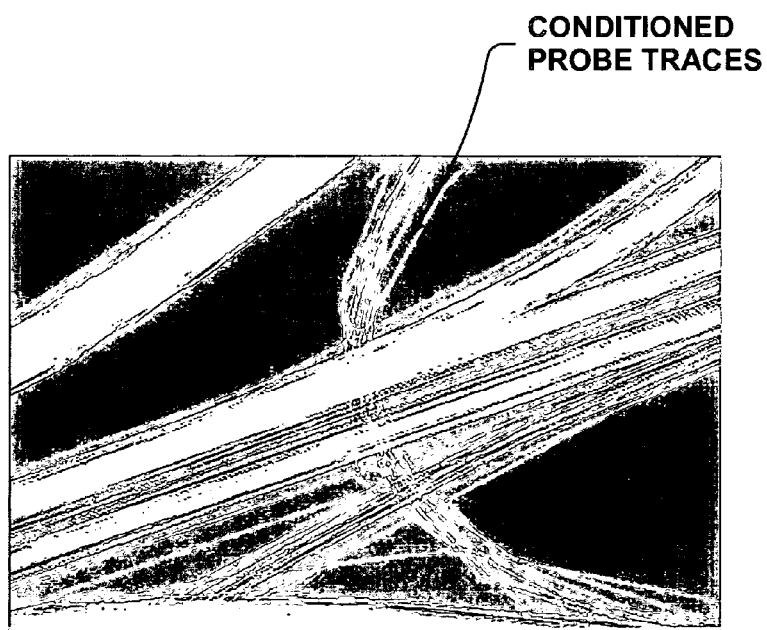

FIGS. 7 and 8 are examples of raw probe traces and conditioned probe traces, respectively.

As shown by comparing FIGS. 7 and 8, the density of conditioned probe traces is greater than for unconditioned traces and the curved representation of the arc in the center of FIG. 8 is smoother relative to the raw probe traces for the same arc shown in FIG. 7.

Figure 9:
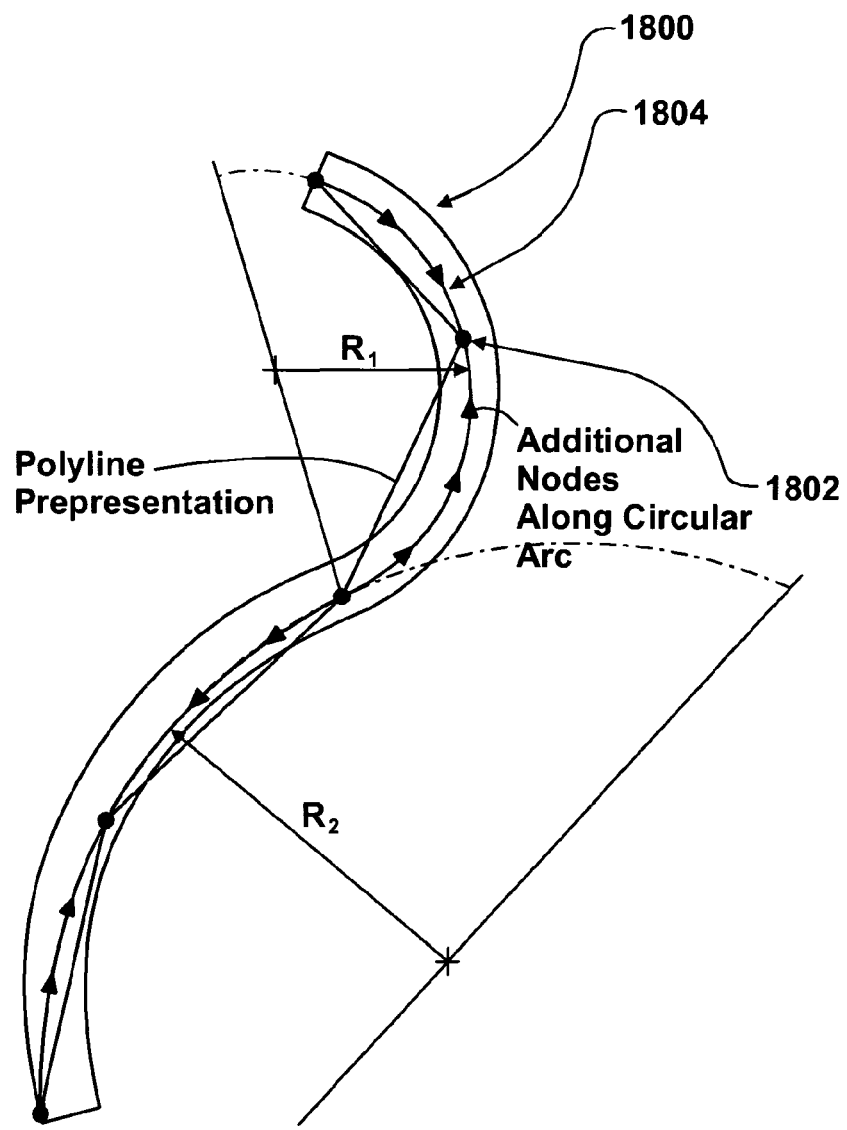
FIG. 9 shows a sparsely sampled probe trace along a curved transportation segment replaced by interpolated points along an inferred curve.

FIG. 9 shows a sparsely sampled probe trace along a curved transportation segment replaced by interpolated points along an inferred curve. In this example, black dots represent measured probe trace points and triangles represent interpolated probe trace points along a circular curve fit to the actual probe data.

Still referring to S2904 in FIG. 6A, in another example conditioning method, the positioning of probe traces is adjusted to the left or right depending on direction of traffic flow for capturing a road centerline. This method of conditioning probe traces may be particularly useful if the objective is to determine the centerline of a two way road. For example, if a fleet of probe vehicles and the GPS or other position location sensor antenna was known to be in the right hand side of the probe vehicle, the GPS measurements may be adjusted to the left (relative to the direction of travel of the probe vehicle) by about half the width of the vehicle in order to center the location measurement on the center of the actual travel path.

Figure 10:
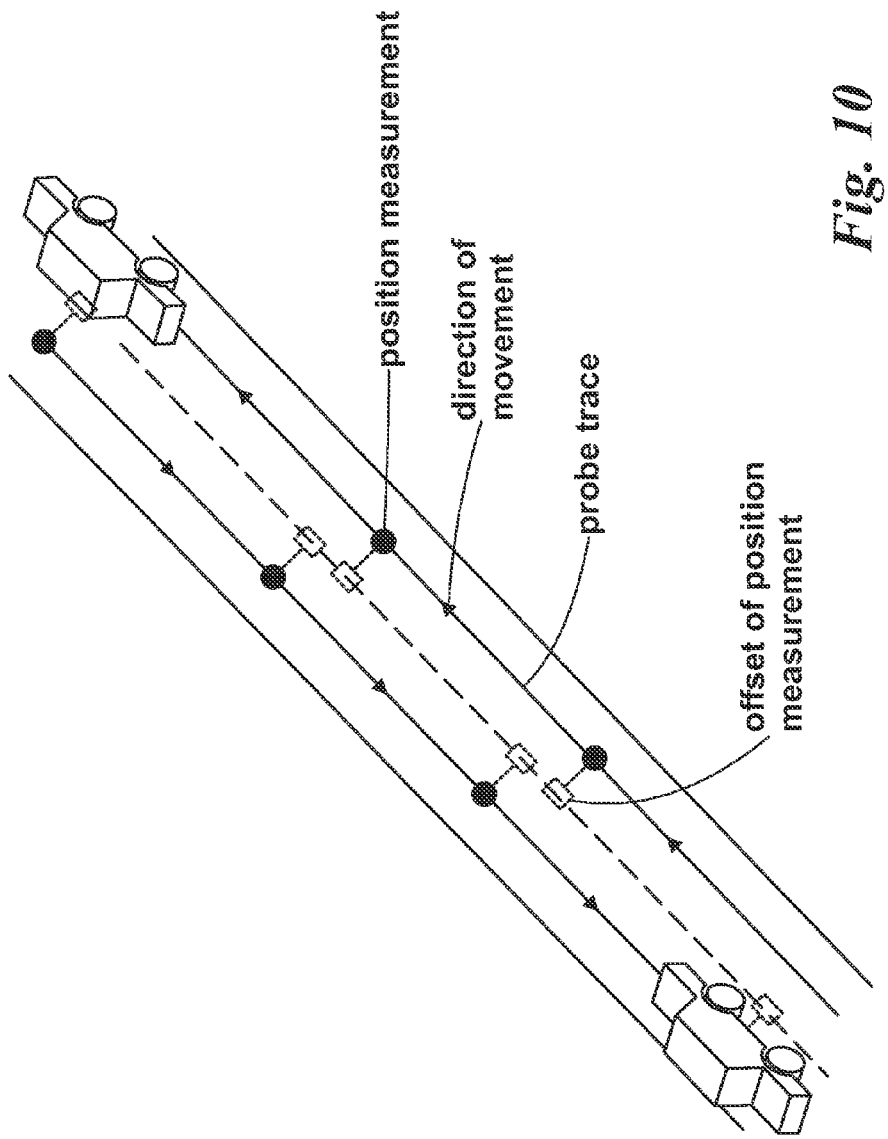
FIG. 10 illustrates an example in which probe traces are adjusted to the left or right of the actual measurement to adjust for direction of traffic flow.

FIG. 10 illustrates an example in which probe traces are adjusted to the left or right of the actual measurement to adjust for direction of traffic flow. As shown in FIG. 10, the probe traces may be altered to the left or right of the actual measurement to adjust for direction of traffic flow in order to center the location measurement on the center of the roadway.

Still referring to S2904 in FIG. 6A, in yet another example probe trace conditioning method, probe traces not associated with the type of transportation network being modelled are filtered out or removed. For example, if a probe trace has points spaced very widely apart, the probe vehicle associated with the probe trace may have been traveling at a very high speed (e.g., the probe vehicle may be an airplane traveling thru the air, rather than on a road). In this case, if a road network is being modelled, this probe trace should be disregarded as not relevant to the transportation network being modelled. In another example, if travel speed is very slow or travel direction inconsistent, the probe trace may be disregarded as corresponding to a pedestrian, cyclist, or a vehicle that is parking, rather than a vehicle traveling on a road.

Because traces of most roads will not intersect themselves, in another example conditioning method, self intersections forming inappropriately small loops in probe traces may be filtered out or removed.

Referring still to S2904 in FIG. 6A, in another example conditioning method, probe traces are broken/segmented at inferred intersections. Because one objective is to combine information from several probe traces to determine aspects of a transportation network and because the travel path for various probe traces may be coincident for only part of the travel path, acquired probe traces may be broken/segmented at intersections with other probe traces or network elements during probe trace conditioning.

Figure 11:
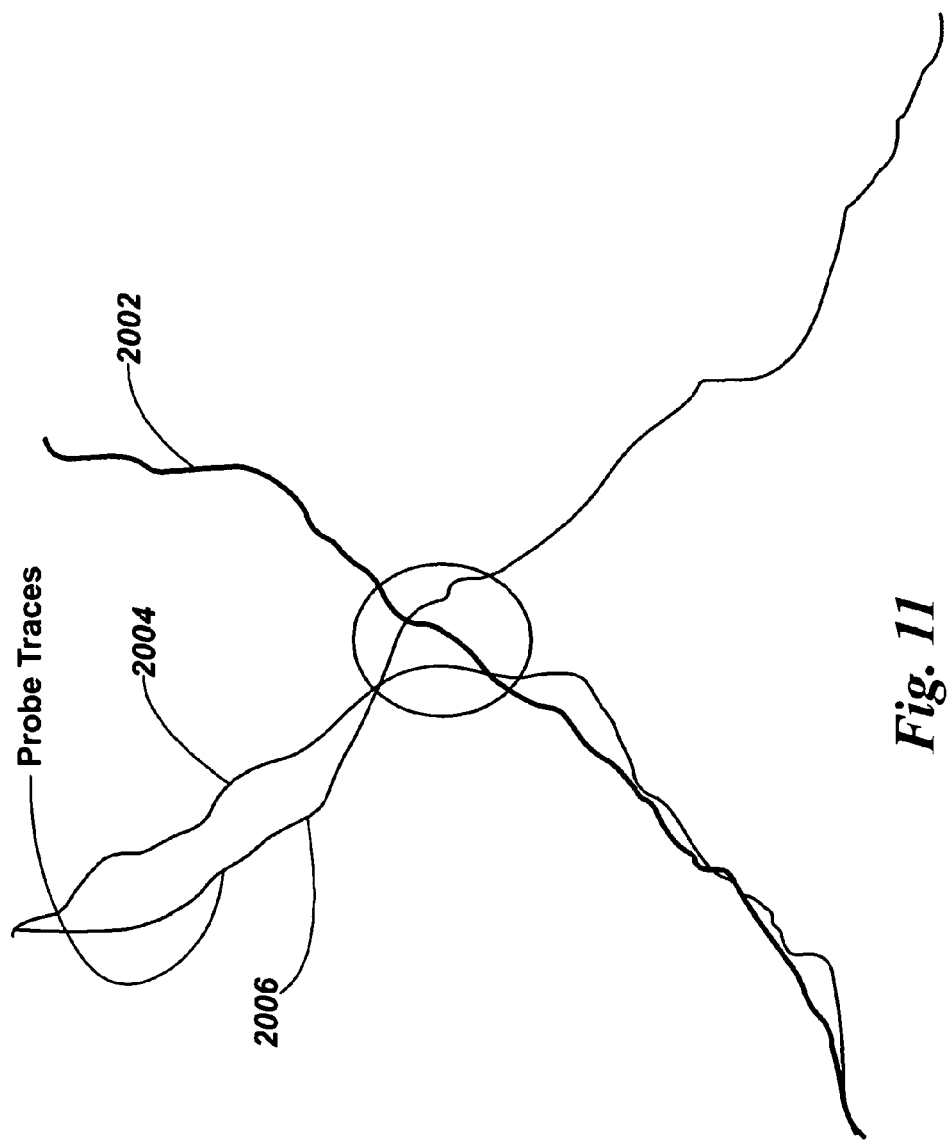
FIG. 11 which illustrates an example including three intersecting probe traces.

FIG. 11 illustrates three intersecting probe traces 2002, 2004 and 2006 for describing an example conditioning method in which probe traces are broken at inferred intersections.

Referring to FIG. 11, probe traces 2004 and 2006 nearly coincide for part of their lengths, and probe traces 2002 and 2004 also nearly coincide for part of their lengths. In this example, an intersection can be inferred in the vicinity of the circle shown in FIG. 11.

Returning to FIG. 6A, after refining the acquired probe traces at S2904, the geographic network generation module 3404 infers geographic objects and/or geometry (e.g., lines, polygons, points, etc.) from the refined probe traces at S2905. In one example embodiment, the geographic network generation module 3404 infers geographic objects as described above with regard to the probe transportation segment geometry and analysis facility 144 shown in FIG. 1. Because methods for inferring geometry and/or geometric objects are known, a detailed description is omitted.

At S2906, the geographic network generation module 3404 clusters the refined probe traces into groups. In one example, the geographic network generation module 3404 spatially groups and indexes the refined probe traces to create a spatial index. In this example, the probe traces are grouped and indexed based on a relative spatial proximity of associated geometry and/or geographic objects.

To determine if individual probe traces should be split via spatial indexing prior to further processing, a set of rules may be defined. Examples of defined rules include: the number of traces that deviate within a certain distance of one another; the permissible angle of deviation; the radius of curvature of the deviation; etc. In one embodiment, the probe traces may be spatially indexed or organized to improve the speed of the comparison. Spatial indexing is a relatively common method for storage and retrieval of data with a geographic component. A spatial index (also referred to as a key) is a number or reference associated with a grid area or grouping of relatively closely spaced spatial objects. Spatial indexing allows for grouping of geographic objects such as lines, polygons or points based on their spatial proximity to one another.

Typically, an index number is assigned to a series of uniform cells that combine to form a geographic frame of reference. All objects within a particular cell are then identified as falling into a cell with a particular cell identification (cell ID). Spatial indexing enables rapid retrieval of geographic objects from a relatively large database of geographic objects based on their location relative to other geographic objects.

If probe traces acquired from several similar devices are accessible, the probe traces may be organized accordingly. Although not discussed herein, other methods for spatial indexing such as range trees may be used to organize entries by area or volumetric extremes may also be used in conjunction with example embodiments.

Figure 12:
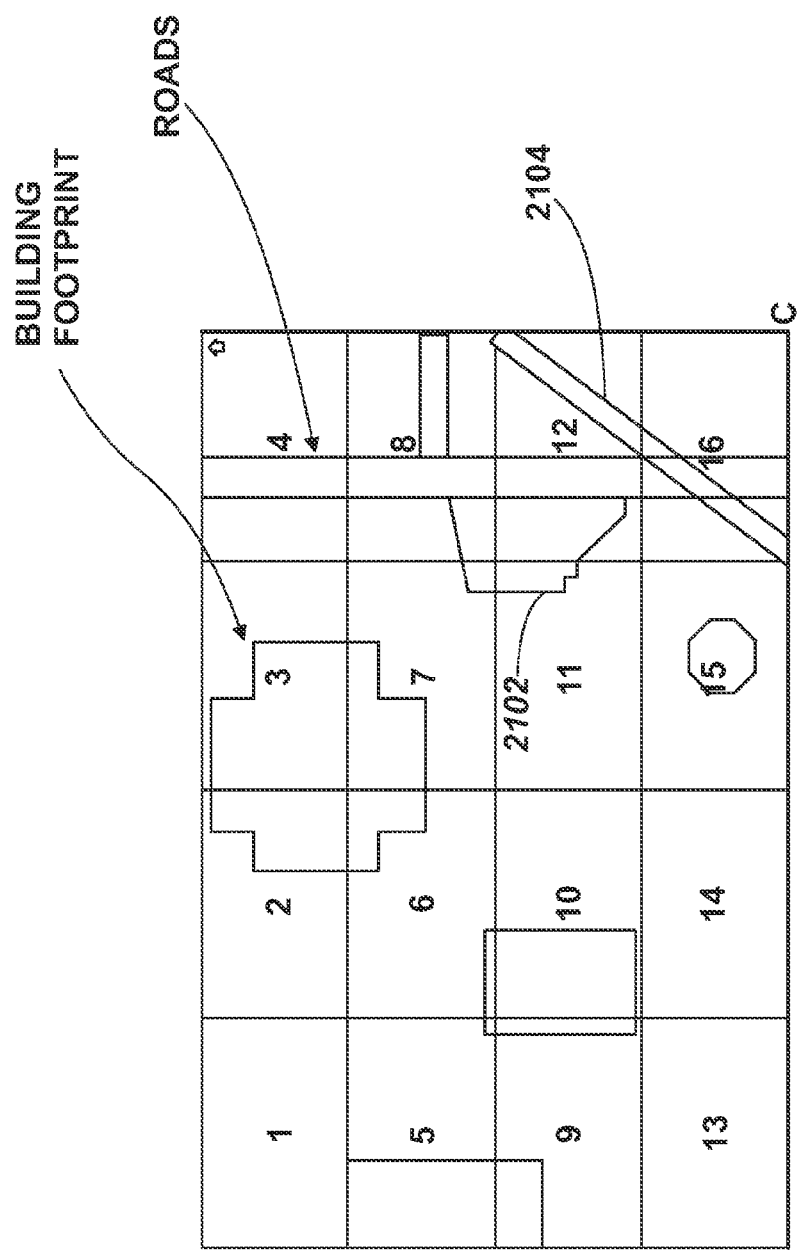
FIG. 12 illustrates an example spatial index.

FIG. 12 illustrates an example spatial index.

Referring to FIG. 12, the spatial objects (building footprints and roads) are associated with the spatial indices (numbers) for the numbered boxes with which the spatial objects intersect.

More specifically, FIG. 12 shows an indexing scheme where geographic objects are assigned an index associated with a grid cell that is part of a regular grid pattern superimposed on the geographic data. The grid dimensions are chosen to optimize analysis of probe traces (e.g., the average amount of probe data that can be analyzed efficiently given the computational equipment available for the task). A geometric object such as the polygons representing building footprints in FIG. 12 are associated with the spatial grid(s) with which they intersect. For example, the building footprint 2102 falls within grids 7, 8, 11 and 12. Likewise, the diagonal road 2104 falls within grids 12 and 16. All probe traces for a given grid area are selected for analysis. In one embodiment, the subsequent analysis is performed on grid cells of approximately 2 km×2 km, an arbitrary size choice determined as a reasonable amount of data to independently process.

In another example, the probe traces may be clustered into groups by creating a Range Tree Data Structure or "R-Tree" for all line segments that make up all probe traces in the above-described grid.

Figure 13:
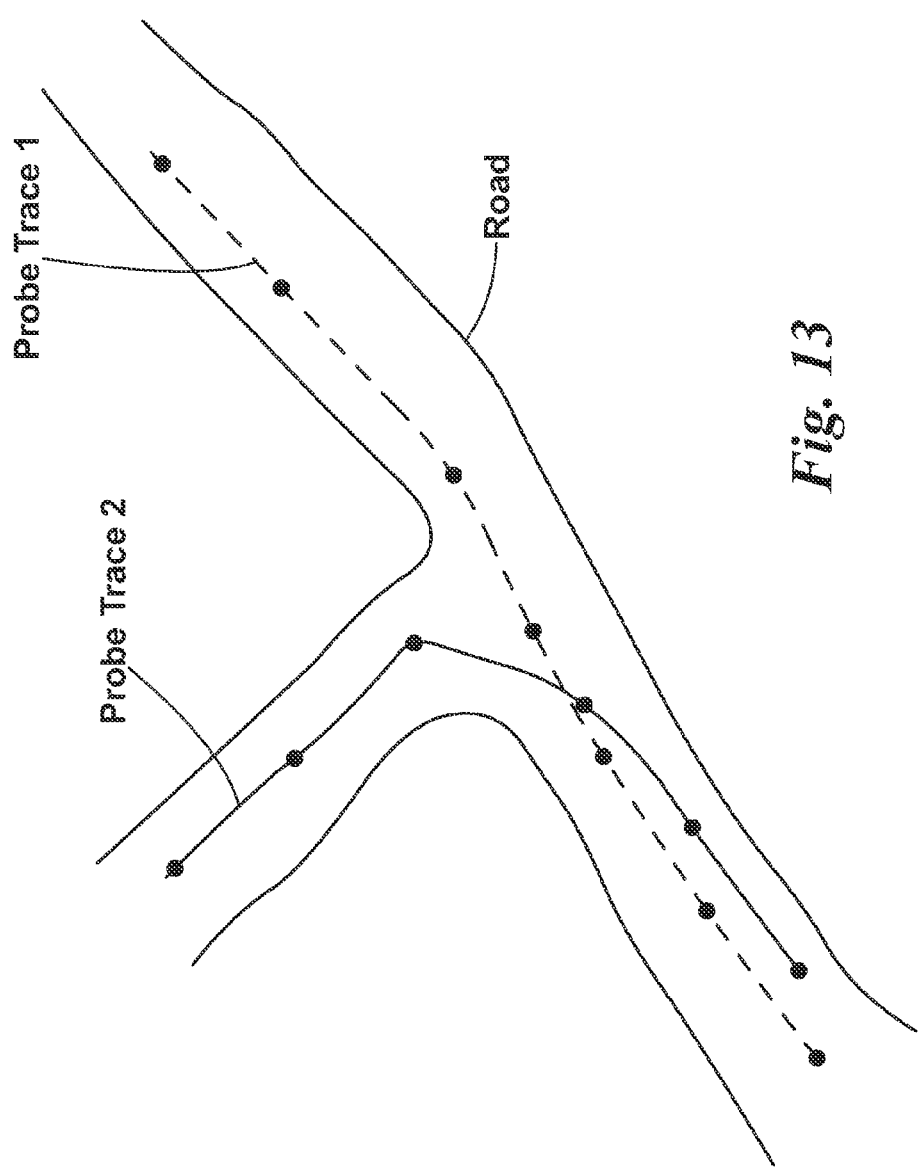
FIG. 13 is a representation of two hypothetical probe traces on a road network.

FIG. 13 shows two hypothetical probe traces (Probe Trace 1 and Probe Trace 2) on a portion of a road network. In this example, black dots represent the GPS measured coordinates that make up the polylines of the two traces.

Figure 14:
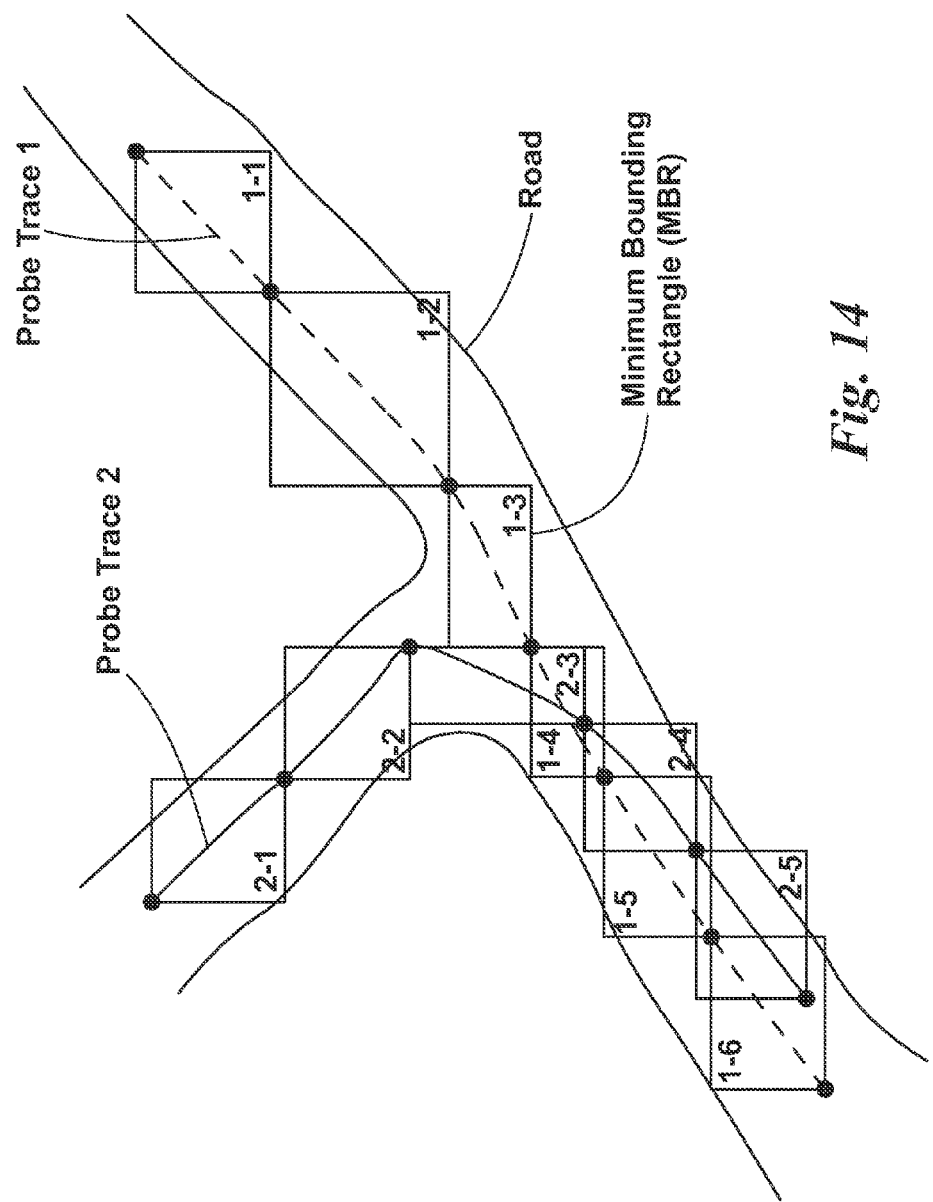
FIG. 14 shows a minimum bounding rectangle (MBR) for each of the line segments between adjacent GPS measurements.

In FIG. 14, the minimum bounding rectangle (MBR) for each line segment between adjacent GPS measurements for Probe Trace 1 and Probe Trace 2 are shown. If each piece of the probe trace (e.g., the line segment connecting two adjacent location points) is examined, the minimum bounding rectangle for the line segment is defined by the minimum and maximum horizontal and vertical coordinates. Assuming recti-linear coordinates or a recti-linear projection of nonplanar coordinates such as latitude and longitude, the minimum bounding rectangle is defined by the coordinates of two points on the rectangle at opposite ends of the same diagonal.

Figure 15:
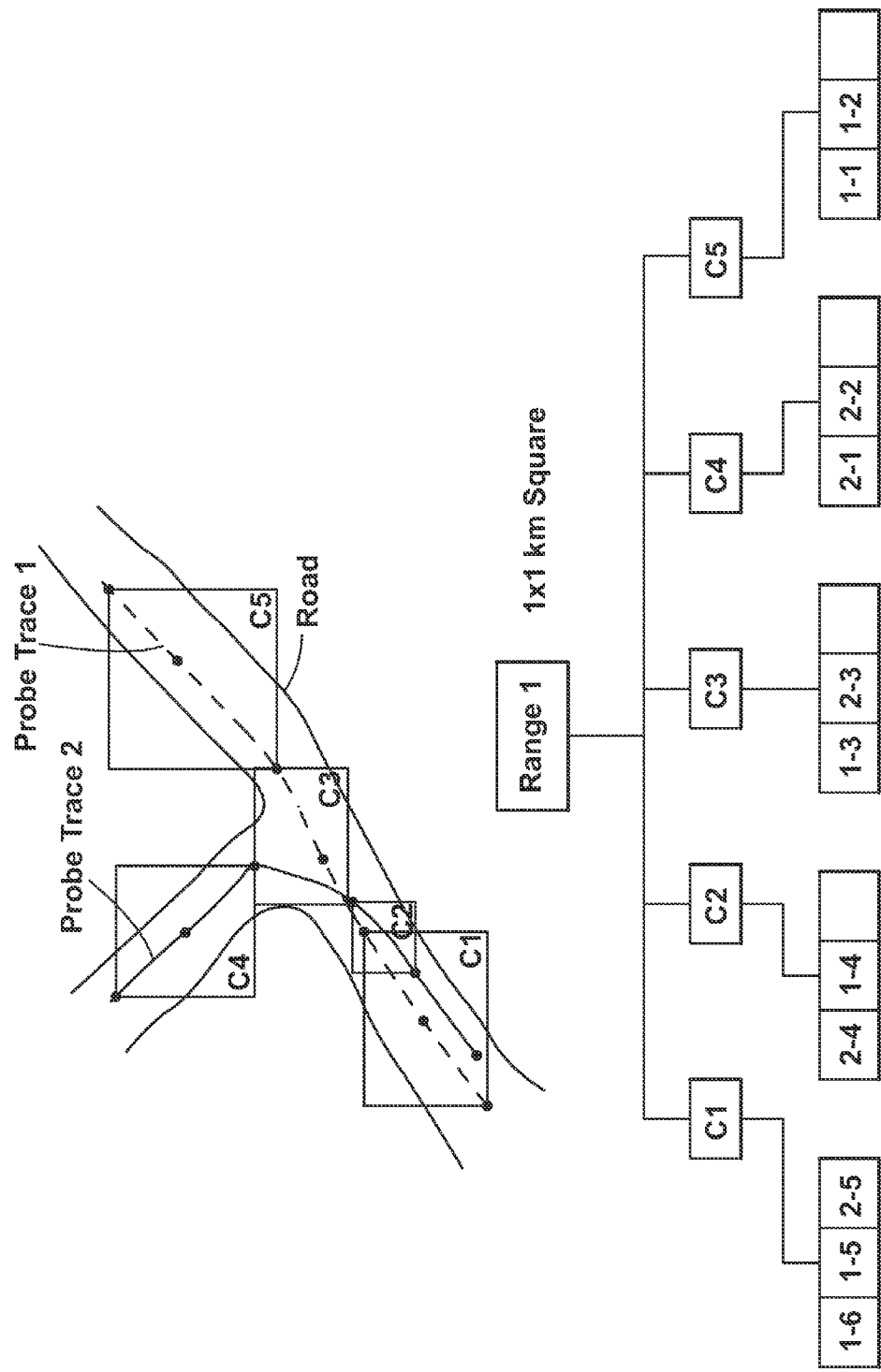
FIG. 15 shows a Range-Tree and a representation of two hypothetical probe traces on a road network with a minimum bounding rectangle (MBR) for each of the line segments.

FIG. 15 shows a Range-Tree and the two hypothetical probe traces (Probe Trace 1 and Probe Trace 2) on a portion of a road network with a minimum bounding rectangle (MBR) for each of the line segments. In this example, the Range-Tree and MBR have an order of 3 meaning that there is a maximum of 3 probe trace segments per range. Depending on the algorithm used for the Range-Tree, up to 3 MBR's make up each cluster or range (C1 thru C5). The relationship of individual MBR's to each Range is shown in the tree diagram. Although order 3 clusters are illustrated for simplicity, it will be understood by those of ordinary skill in the art that much larger orders are practicable for real world situations. In example embodiments, cluster orders of at least about 200 are preferred. This relationship may be used later for rapidly selecting line segments to analyze. The algorithm may be modified to select ranges by close spatial proximity, by similar compass orientation, etc. Further discussion of Range-Trees and Spatial indexing may be found in "The Use of Range-Tree Spatial Indexing to Speed GIS Data Retrieval," by Bruce Blackwell at http://mapcontext.com/autocarto/proceedings/auto-carto-8/pdf/the-use-of-range-tree-spatial-indexing-to-speed-gis-data-retrieval.pdf.

According to example embodiments, a measurement of probe trace accuracy or reliability can be described as the number of similar probe traces that corroborate the position, heading, or other information; that is, a self-referencing quality check. Therefore, one or more cluster indices may be used to select/find the best probe segments for later processing. In this example, each cluster index uses a selection of probe trace segments.

The selection criteria used to build the cluster indices may be different depending on the desired outcome. For example, if the desired level of precision is to map directional travel flow paths, instead of road centerlines, clusters of probe traces may be chosen such that all line segments within any one cluster are oriented in the same direction and within a negligible tolerance angle. Some other example methods for clustering probe traces include: grouping only traces known to come from commercial trucks; grouping probe traces that are known to be taken at a certain time of day or week; grouping when the GPS satellites are in the same location in the sky; grouping traces from vehicles traveling at similar speeds, etc. More than one such criteria may be useful for selecting traces. For example, traces that are oriented in the same direction within a negligible tolerance angle and which are also known to travel at similar speeds may be selected.

Although not discussed herein, any other clustering and/or spatial indexing schemes may be used (e.g., Quad Trees, B-Trees, mathematical clustering on interlaced coordinate values (a.k.a. Peano or Morton codes), etc.).

Returning to FIG. 6A, at S2907 the geographic network generation module 3404 builds a geographic network by converting all probe traces in each group. In one example, each group of clusters refers to probe traces lying within a respective grid of the spatial index. An example method for building a geographic network will be described in more detail below with regard to FIG. 6B.

Figure 6B:
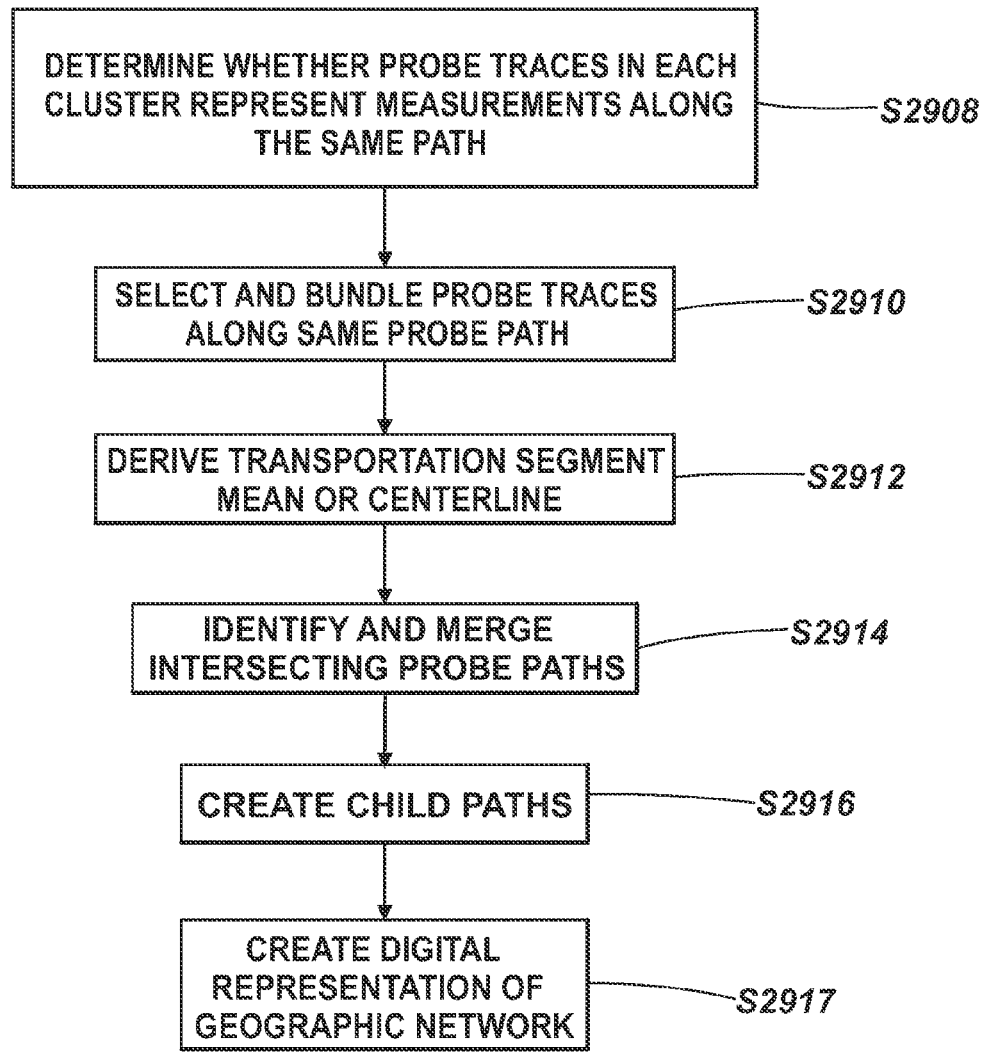
FIG. 6B is a flow chart illustrating a method for building a digital geographic network according to an example embodiment.

Although not shown in FIG. 6A or 6B, the processor 204 may determine a processing order for the clustered probe traces. In one example embodiment, probe traces may be ordered for processing such that probe traces having the greatest number of coincident probe traces within the cluster that best corroborates their position, heading, type, or other selection criteria are processed first. More specifically, for example, the probe traces are ordered by locating the probe traces passing near the greatest density of probe measurements. This may be determined by selecting probe traces passing nearest to the largest number of clusters with the highest density index. A relative probe trace density may be measured by creating a density index based on the calculated Range-Tree. In this example, the density index $D_j$ is described by the total length of line segments $L_{TOTj}$ within each cluster divided by the square root of the area $A_{CLUj}$ of the cluster ($D_j = L_{TOTj}/\sqrt{A_{CLUj}}$). In this example, j is a natural number representing the cluster.

Figure 16:
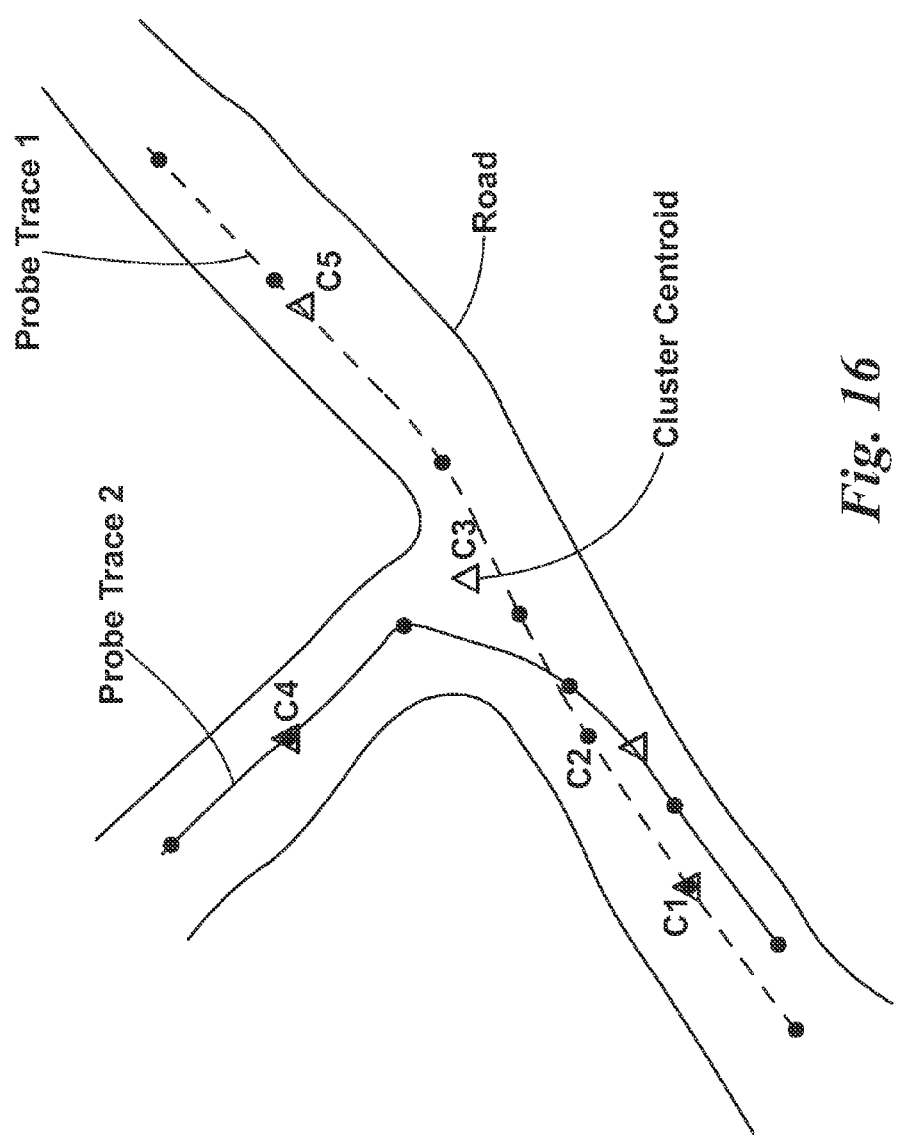
FIG. 16 shows density points for the clusters shown in FIG. 24.

FIG. 16 shows density points for the clusters plotted at the centroid of the clusters for the two hypothetical probe traces introduced in FIG. 13.

Figure 17:
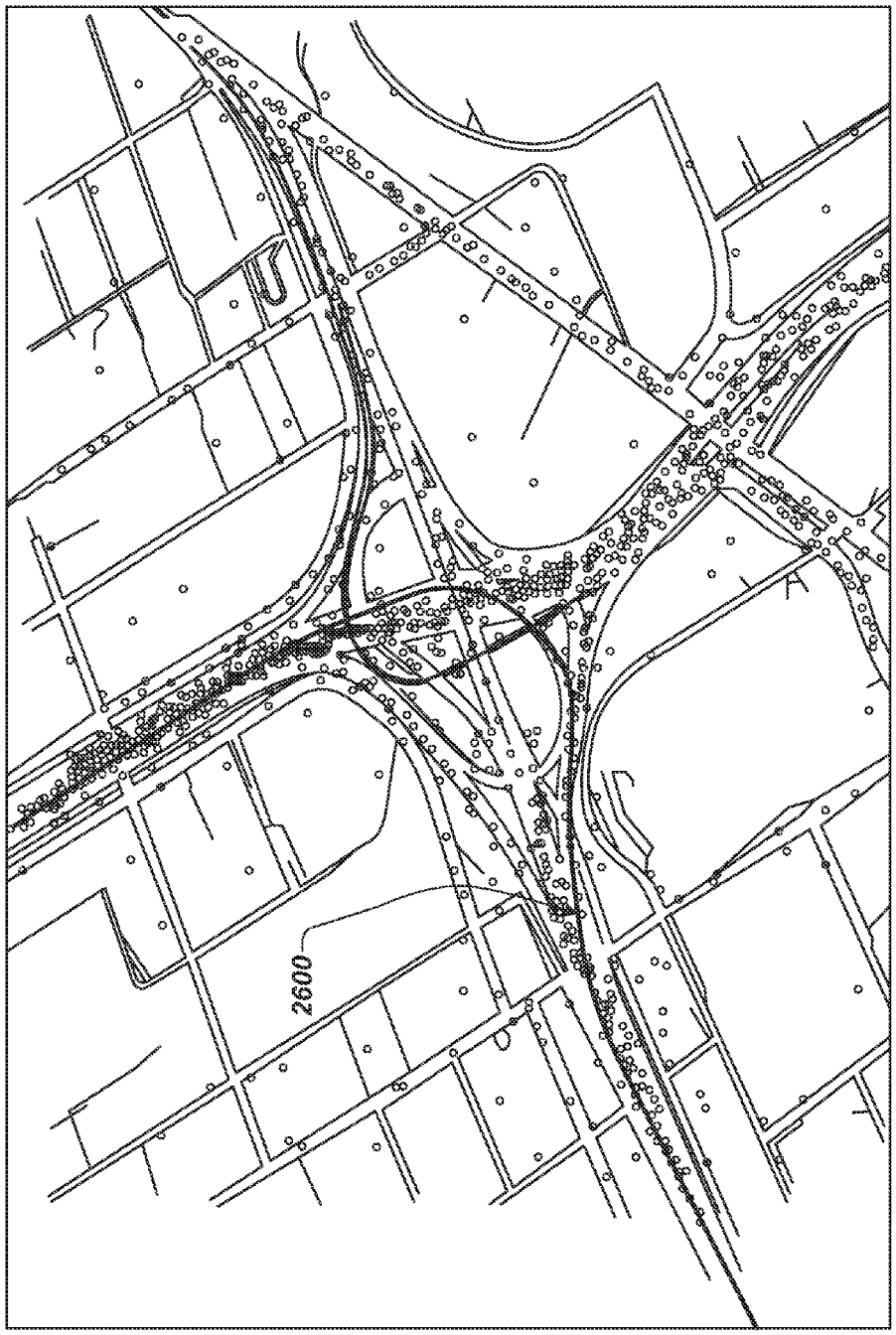
FIG. 17 shows data containing density centroids from probe traces.

FIG. 17 shows actual data containing density centroids from actual probe traces using clusters on the order of about 200.

Referring to FIG. 17, in this example, probe traces for a road network are shown as white lines, probe trace density points are shown as black circles, and a single probe trace is identified as 2600. The single probe trace 2600 is the probe trace that passes near the greatest density of probe measurement clusters, which match its direction at any point. Probe traces may be ordered via said density for further analysis. That is, for example, the probe traces nearest to the high-density same-direction clusters may be analyzed (as described in more detail later) first.

FIG. 6B is a flow chart illustrating a method for building a geographic network according to an example embodiment.

Returning again to FIG. 6B, at S2908 the geographic network generation module 3404 statistically analyzes probe traces in each cluster to determine whether the probe traces represent measurements along the same probe path. A probe path is, for example, any path, for a given window, traversed by one or more probe traces having the same beginning and end within a spatial threshold value, and which do not deviate in location more than a threshold value from a reference probe trace. A probe path may traverse one or more connected transportation segments. In one example, if two or more probe traces travel adjacent to each other over a distance greater than a threshold distance (e.g., about 1 mile) and the paths do not diverge greater than a given threshold (e.g., about 5 meters) when measured perpendicular at any location along one of the probe traces designated as the reference path, then the probe traces may be determined to represent measurements along the same probe path. In another example, if it is known that the probe trace follows a route prescribed by a navigation system to get to a destination, then other probe traces following the same prescribed route can be assumed to be travelling along the same probe path.

After determining which probe traces represent the same probe path, at S2910 the geographic network generation module 3404 selects and bundles the probe traces traveling along the same path.

Figure 18:
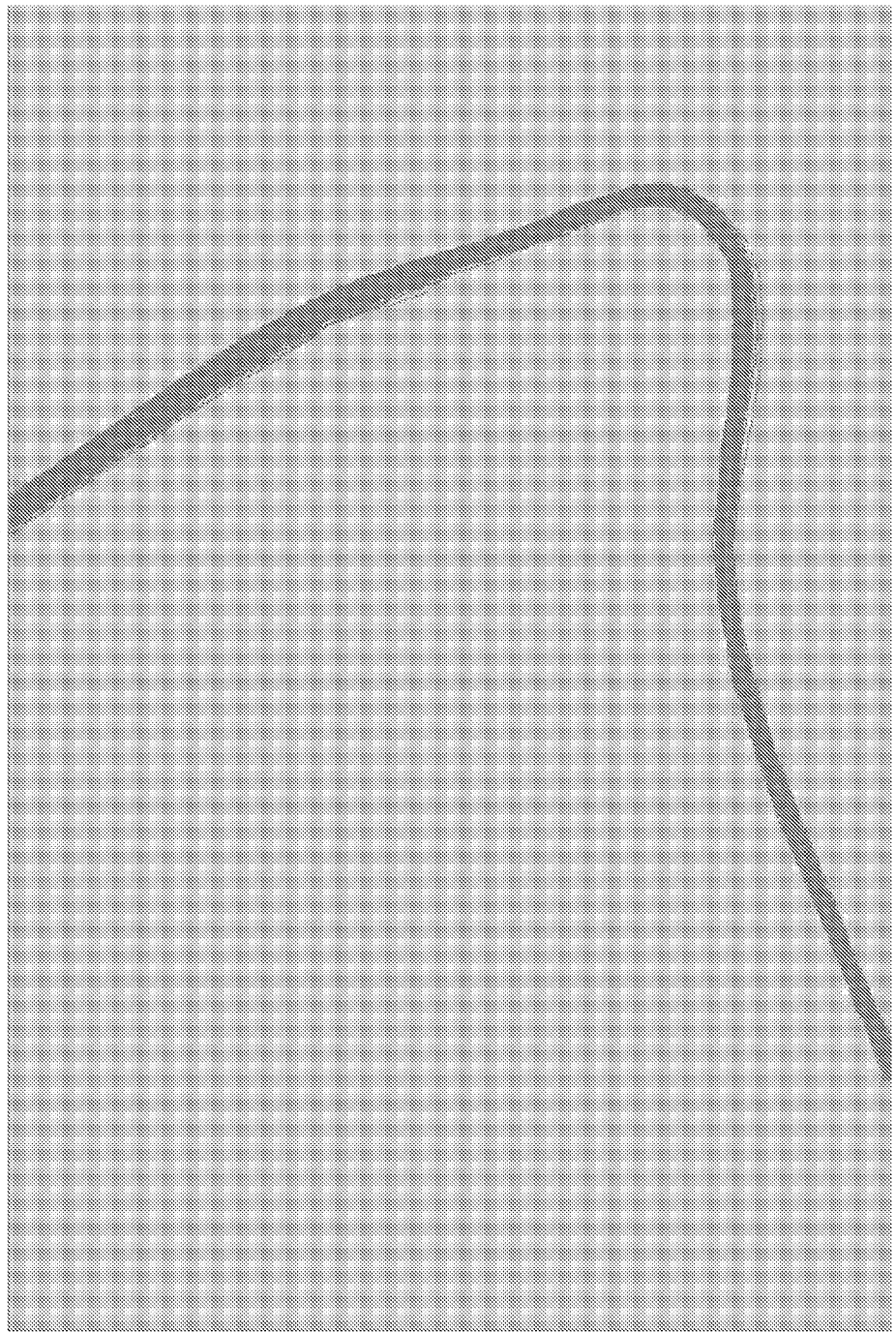
FIG. 18 shows an example of all probe traces selected to determine the mean probe trace for the trace in FIG. 17.

In one example with regard to FIG. 17, the probe trace passing through the most densely populated area of probe traces within the grid is selected for determining an initial probe path. The geographic network generation module 3404 then selects all probe traces adjacent to the selected probe trace that do not deviate more than given, desired or pre-specified distance at any location along the probe trace. "Child" probe traces are also included in this selection and bundling. Child probe traces refer to probe traces that fall along the probe path within the same deviation threshold, but only traverse a portion of the seed trace. An example representation of all probe traces selected to determine the mean probe trace for the red probe trace 2600 in FIG. 17 is shown in FIG. 18.

Returning to FIG. 6B, at S2912 the geographic network generation module 3404 derives a mean or centerline of transportation network segments along the probe path by statistically weighting the bundled probe traces. In one example, at intervals along the seed probe trace (e.g., 2600 in FIG. 17) being analyzed, points located sequentially along the mean transportation path are determined based on the Gaussian distribution of extrapolated points that fall on a line perpendicular to the travel direction of the seed probe trace for all other selected probe traces as shown in FIG. 20.

Figure 20:
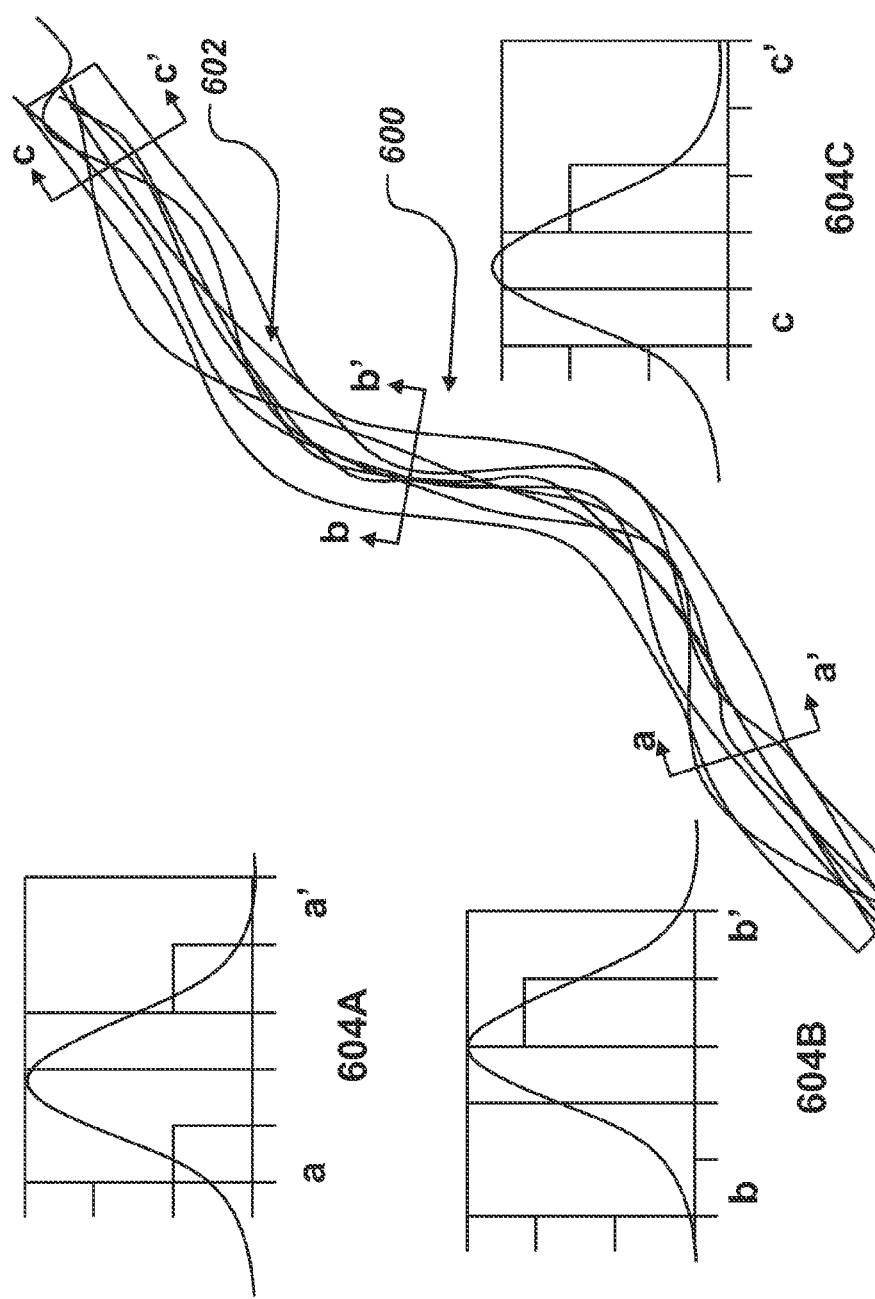
FIG. 20 illustrates example probe traces along a transportation network segment and associated cross-sectional graphs.

More specifically, FIG. 20 illustrates example probe traces 602 along a transportation network segment 600. FIG. 20 also shows cross-sectional graphs 604A, 604B and 604C. The vertical axis on each of graphs 604A through 604C represents the relative frequency of probe trace crossings at discrete intervals along the transportation network segment 600.

According to example embodiments, steps S2908 and S2910 in FIG. 6B may be repeated for all unique probe paths. As described above, a unique probe path is any path, for a given window, traversed by one or more probe traces having the same beginning and end within a spatial tolerance, and that does not deviate in location more than a threshold value from a reference trace.

FIG. 19 shows an example of progressive mean probe trace processing starting with the largest density of coincident probe traces shown in FIG. 19(a), followed by a second largest in FIG. 19(b) and so on in FIGS. 19(c) and 19(d).

More specifically, FIG. 19 shows the progression of deriving probe paths. In FIG. 19(a), all traces that go from along the dark black path in the direction shown are found and an average is created. In FIG. 19(b), the first path and the next path are shown, and the first path is adjusted where the two paths are merged. FIGS. 19(c) and 19(d) continue to build out along unique probe paths.

Referring again back to FIG. 6B, at step S2914 the geographic network generation module 3404 identifies and merges intersecting probe paths. As described above, a probe path is a path traversed by one or more probe traces having the same beginning and end within a spatial threshold value and which does not deviate, in location, more than a threshold value from a reference probe trace. The probe paths may be identified or associated with a centerline derived as described above. In this example, once all probe paths are determined, the geographic network generation module 3404 identifies intersecting probe paths. Probe paths can: cross at a point; converge at a small angle (e.g., indicative of a merger); run closely parallel (e.g., indicative of multiple lanes, elevated separated roadways, etc.); etc. Depending on the detail and precision with which a transportation network is being created, probe paths running parallel may be kept as separate entities to describe individual lanes. On the other hand, if a multi-lane road is to be described by a single centerline, probe traces may be merged.

Likewise, the probe paths may be merged or kept separate when probe paths intersect at a relatively small angle. As noted above, in one example, a relatively small angle of intersection between mean probe paths may indicate a merging lane onto a freeway. An example of such a merge is shown in FIG. 19(b). The geographic network generation module 3404 may merge probe paths by deriving a new path which averages the distance that separates the probe paths. Alternately, a weighted average may be used, in which the final position is represented by multiplying sampled positions along the two mean probe centerlines with the number of traces involved in each centerline. This weighted average $AVG_{WTi}$ is mathematically represented by Equation (1) shown below:

$$AVG_{WTi}=(D_1*P_{1i}+D_2*P_{2i})/(D_1+D_2) \qquad (1)$$

In Equation (1), $D_1$ and $D_2$ are the number of probe traces comprising centerline 1 and 2, respectively, and $P_{1i}$ and $P_{2i}$ are point locations of centerline 1 and 2 at an offset i along the mutual portion of the path, for i varying in small increments from the point of merge to the final point of mutual travel. The series of images in FIGS. 19(a) through 19(d) shows examples of how probe paths intersect and are merged.

After identifying and merging intersecting probe paths, the geographic network generation module 3404 creates child paths at S2916. Child paths are created by splitting the remaining probe paths at intersection points. In one example, a node is positioned where two probe paths intersect within a specified spatial tolerance, with the merged section determined as described above. The child path, that is, the remaining portion of each path centerline, is calculated and is geometrically forced to meet the node point in a manner commonly available in the art. In so doing, the probe paths are split at the intersection node to form child probe paths.

In an example embodiment, steps S2914 and S2916 are performed successively for each case where a merge is identified, rather than in a more strict sequence.

Child paths are a subsection of a longer probe path. For example, a set of probe traces may extend from the top to the bottom of a frame. Another set of probe traces may extend from the top to the right hand side of the frame. If the beginning of both sets of probe traces follows the same path, child paths along the coincident path of both sets of paths may be created thereby providing a greater number of probe paths to analyze. This may increase statistical significance when examining the coincident child paths together.

Once coincident child paths are analyzed together, the geometry may shift geometry as new probe traces are averaged together. This shift will most likely occur where the original traces diverge. If two probe trace sets are coincident and one probe trace set moves right on a ramp and one probe trace set stays straight, all the vehicles moving right were likely in the right lane and vehicles going forward may have been in either the right or left lane. Consequently, when the two probe traces are averaged, the average is likely to move to the right.

Returning to FIG. 6B, at S2917, the geographic network generation module 3404 builds the geometric information into a digital geographic network suitable for consumption by other computer programs and/or processors.

For example, to build a digital geographic network in which nodes represent intersections and street segments represent street elements between nodes, the geographic network generation module 3404 stores nodes computed while merging the probe paths as network intersection nodes in a digital database in the mass storage device 312. The geographic network generation module 3404 also stores geometric paths as street segments in the digital database.

Additional known methods may also be used to generate the digital geographic network at S2917 to ensure that the digital geographic network meets quality and consistency requirements for later use.

In one example, the geographic network generation module 3404 generalizes (e.g., reduces the shape count of) each geometric path via, for example, Douglas-Peucker generalization in order to represent the street segment with as few shape points as necessary to generate a line within a specified tolerance distance of the actual centerline position.

According to example embodiments, a digital geographic network compatible with a planar graph (e.g., in which paths cross only at nodes) may be generated. In this example, at S2917 the geographic network generation module 3404 calculates the location of crossing centerline positions and places a node at these calculated positions. The geographic network generation module 3404 then splits each centerline, which crosses at the calculated position so as to avoid crossing lines. In one example, these newly created nodes are marked as non-interacting nodes (e.g., a candidate for grade-separated crossing or a legally restricted maneuver).

In example embodiments in which the original probe traces are associated with a corresponding geographic network centerline, known database techniques may be employed to create a relationship between each centerline and the probe traces from which the centerline is generated.

In example embodiments in which the digital geographic network is also to be used for applications such as routing, which requires knowledge of legally or physically restricted maneuvers, nodes are further marked such that each pair of attached street segments, which are built from one or more common probe paths proceeding through that intersection, is marked as traversable in that direction. In contrast, each pair of attached street segments, which do not contain common bundled probe paths in either the forward or reverse direction, is designated as restricted in the corresponding direction.

The examples discussed herein are illustrative only, and example embodiments should not be limited by this discussion. Indeed, one of ordinary skill in the art will be aware of additional ways to build a database from merged/child probe paths.

In example embodiments, although not explicitly discussed herein after merging intersecting probe paths and creating child paths as described above, a digital representation of the geographic network (digital geographic network) may be generated in any known manner at step S2917.

Returning to FIG. 6A, after creating the digital geographic network at S2917, at S2918 the digital transportation network generation module 3204 creates a digital representation of the transportation network by linking transportation network elements to adjacent and coincident elements in adjacent clusters (e.g., indexed areas).

In one example, the edges of each grid element are analyzed to determine if a polyline that terminates at an edge of one grid element is coincident with another terminated polyline in an adjacent grid element. If such coincidence occurs within a specified tolerance, the polyline is merged with the adjacent polyline in the adjacent grid. The geographic coordinate assigned to the common merge point may be the average of the terminal point of the two matching polylines, or may be a weighted average $AVG_{TP}$ given by Equation (2) shown below.

$$AVG_{TP}=(D_1*P_1+D_2*P_2)/(D_1+D_2) \qquad (2)$$

In Equation (2), $D_1$ and $D_2$ are the number of probe traces comprising centerline 1 and 2, respectively, and $P_1$ and $P_2$ are the terminal point locations of centerline 1 and 2 that have been deemed to meet. One of ordinary skill in the art will recognize that coincidence of more than two lines may occur at the edge of grid elements, and that the merge may be performed in the same manner for 3, 4, or more centerlines that terminate at or near a common point.

At S2920, the digital transportation network generation module 3204 applies further attribution to the transportation network elements thereby generating a digital representation of the transportation network. The further attribution may be: gleaned from the probe traces; inferred from the process; and applied to the individual transportation objects (e.g., polylines and/or nodes). Examples of these attributes/attributions are: direction of traffic flow (one-way or two way); number of lanes in a multilane highway; no left turn; no turns; no right turn; average speed limits; stop signs/signals; elevation for polylines; allowable vehicle types (provided the type of vehicle containing the position sensor is known for most of the probe vehicles); etc.

Methods according to example embodiments described above may be implemented in the form of a device, such as a server and/or a navigation device. Thus, such aspects are encompassed within at least one example embodiment of the present application.

Further, although some example embodiments are described separately it will be understood that these embodiments may be combined into one or more other embodiments.

Further, at least one of the methods of at least one embodiment may be implemented as a computer data signal embodied in the carrier wave or propagated signal that represents a sequence of instructions that, when executed by a processor (e.g., such as the processor 204 of the server 202, and/or the processor 510 of the navigation device 200), causes the processor to perform a respective method.

According to at least one other embodiment, one or more methods described herein may be implemented above as a set of instructions contained on a computer readable or computer accessible medium, such as one of the memory devices previously described, for example, to perform the respective method when executed by a processor or other computer device. In varying embodiments, the medium may be a magnetic medium, electronic medium and/or optical medium.

Even further, any of the aforementioned methods may be embodied in the form of a computer program. The computer program may be stored on a computer readable media and is adapted to perform any one of the aforementioned methods when run/executed on a computer device (a device including a processor). Thus, the storage medium, computer readable medium, or computer readable storage medium is adapted to store information and is adapted to interact with a data processing facility or computer device to perform the method of any of the above mentioned embodiments.

As one of ordinary skill in the art will understand upon reading the disclosure, the electronic components of the navigation device 200 and/or the components of the server 202 may be embodied as computer hardware circuitry or as a computer readable program, or as a combination of both.

The systems, devices and/or methods described herein may include software operative on a processor. One of ordinary skill in the art will understand, upon reading and comprehending this disclosure, the manner in which a software program can be launched from a computer readable medium in a computer based system to execute the functions found in the software program. One of ordinary skill in the art will further understand the various programming languages which may be employed to create a software program designed to implement and perform at least one of the methods of the present application.

The programs can be structured in an object-orientation using an object-oriented language including but not limited to JAVA, Smalltalk and C++, and the programs can be structured in a procedural-orientation using a procedural language including but not limited to COBAL and C. The software components can communicate in any number of ways that are well known to those of ordinary skill in the art, including but not limited to by application of program interfaces (API), interprocess communication techniques, including but not limited to report procedure call (RPC), common object request broker architecture (CORBA), Component Object Model (COM), Distributed Component Object Model (DCOM), Distributed System Object Model (DSOM), and Remote Method Invocation (RMI). However, as will be appreciated by one of ordinary skill in the art upon reading the present application disclosure, the teachings of the present application are not limited to a particular programming language or environment.

The above systems, devices, and methods have been described by way of example and not by way of limitation with respect to improving accuracy, processor speed, and ease of user interaction with a navigation device.

Further, elements and/or features of different example embodiments may be combined with each other and/or substituted for each other within the scope of this disclosure and appended claims.

Still further, any one of the above-described and other example features may be embodied in the form of an apparatus, method, system, computer program and computer program product. For example, any of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope, and all such modifications as would be obvious to one skilled in the art are intended to be included within the scope of the following claims.

What is claimed is:

1. A method for creating a digital representation of a transportation network, the method comprising:
refining acquired probe traces based on characteristics of the transportation network, the probe traces being a plurality of sequential location measurements from a plurality of devices;
identifying geographic objects associated with the transportation network based on the refined probe traces;
building a digital geographic network based on the refined probe traces and identified geographic objects; and creating the digital representation of the transportation network by linking the identified geographic objects in the digital geographic network.

2. The method of claim 1, further comprising:

clustering the refined probe traces based on a relative spatial proximity of associated geographic objects; and wherein the building of the digital geographic network includes, bundling, for each unique probe path in the transportation network, probe traces in each cluster representing measurements along a same probe path;

identifying and merging probe paths that intersect one another;

creating child probe paths by splitting probe paths at intersection points; and building the geographic network based on the merged probe paths and child probe paths.

3. The method of claim 2, wherein the clustering of the refined probe traces comprises:

creating one of a spatial index and range-tree structure based on the refined probe traces.

4. The method of claim 2, wherein the unique probe path is a path traversed by one or more probe traces having the same beginning and end within a spatial threshold value and which does not deviate, in location, more than a threshold value from a reference probe trace.

5. The method of claim 2, wherein the bundling comprises:

identifying a reference probe trace for each bundle of probe traces, and bundling, for each reference probe trace, probe traces that do not deviate more than a given distance from the reference probe trace.

6. The method of claim 2, wherein the identifying and merging comprises:

identifying intersecting centerline probe traces;

averaging a distance separating the centerline probe traces; and merging probe paths based on the averaged distance.

7. The method of claim 2, wherein the clustering of the refined probe traces comprises:

generating a spatial index for the refined probe traces, the spatial index including a grid having a plurality of grid cells, each grid cell including a representation of a portion of the geographic objects of the transportation network.

8. The method of claim 7, wherein the creating comprises:

linking geographic objects to adjacent and coincident geographic objects in adjacent spatially indexed areas.

9. The method of claim 1, further comprising:

applying attribution to the geographic objects.

10. The method of claim 9, wherein the attribution includes at least one of direction of traffic flow, number of lanes in a multilane highway, turn restrictions; average speed limits, stop signs, stop signals, elevation for polylines, and allowable vehicle types.

11. The method of claim 1, wherein the refining of probe traces includes at least one of curve smoothing, adjusting the positioning of probe traces depending on direction of traffic flow for road centerline capture, filtering probe traces not associated with a type of the transportation network, and segmenting probe traces at inferred intersections.

12. A system for creating a digital representation of a transportation network, the system comprising:

a geographic network generation module configured to, refine acquired probe traces based on characteristics of the transportation network, the probe traces being a plurality of sequential location measurements from a plurality of devices, identify geographic objects associated with the transportation network based on the refined probe traces, and build a digital geographic network based on the refined probe traces and identified geographic objects; and a digital transportation network generation module configured to create the digital representation of the transportation network by linking geographic objects among groups of geographic objects in the digital geographic network.

13. The system of claim 12, wherein the geographic network generation module is configured to, cluster the refined probe traces based on a relative spatial proximity of associated geographic objects, and the digital transportation network generation is configured to, bundle, for each unique probe path in the transportation network, probe traces in each group representing measurements along a same probe path, identify and merge probe paths that intersect with one another, create child probe paths by splitting probe paths at intersection points, and generate the geographic network based on the merged probe paths and child probe paths.

14. The system of claim 13, wherein the geographic network generation module is configured to create one of a spatial index and range-tree structure based on the refined probe traces.

15. The system of claim 13, wherein the probe path is a path traversed by one or more probe traces having the same beginning and end within a spatial threshold value and which does not deviate, in location, more than a threshold value from a reference probe trace.

16. The system of claim 13, wherein the geographic network generation module is further configured to, identify a reference probe trace for each bundle of probe traces, and bundle, for each reference probe trace, probe traces that do not deviate more than a given distance from the reference probe trace.

17. The system of claim 13, wherein the geographic network generation module is further configured to, identify intersecting centerline probe traces, average a distance separating the centerline probe traces, and merge the probe paths based on the averaged distance.

18. The system of claim 13, wherein the geographic network generation module is further configured to, generate a spatial index for the refined probe traces, the spatial index including a grid having a plurality of grid cells, each grid cell including a representation of a portion of the geographic objects of the transportation network.

19. The system of claim 18, wherein the digital transportation network generation module is further configured to link geographic objects to adjacent and coincident geographic objects in adjacent spatially indexed areas.

20. The system of claim 12, wherein the digital transportation network generation module is further configured to apply attribution to the geographic objects.

21. The system of claim 20, wherein the attribution includes at least one of direction of traffic flow, number of lanes in a multilane highway, turn restrictions; average speed limits, stop signs, stop signals, elevation for polylines, and allowable vehicle types.

22. The system of claim 12, wherein the geographic network generation module is further configured to refine probe traces by at least one of curve smoothing, adjusting the positioning of probe traces depending on direction of traffic flow for road centerline capture, filtering probe traces not associated with a type of the transportation network, and segmenting probe traces at inferred intersections.

* * * * *